(12) United States Patent
Thut

(10) Patent No.: US 7,497,988 B2
(45) Date of Patent: Mar. 3, 2009

(54) VORTEXER APPARATUS

(76) Inventor: Bruno H. Thut, 16755 Park Circle Dr., Chagrin Falls, OH (US) 44023-4598

( * ) Notice: Subject to any disclaimer, the term of this patent is extended or adjusted under 35 U.S.C. 154(b) by 439 days.

(21) Appl. No.: 11/348,635

(22) Filed: Feb. 7, 2006

(65) Prior Publication Data

US 2006/0180963 A1  Aug. 17, 2006

Related U.S. Application Data

(63) Continuation-in-part of application No. 11/292,988, filed on Dec. 2, 2005, and a continuation-in-part of application No. 11/044,436, filed on Jan. 27, 2005, now Pat. No. 7,314,348.

(60) Provisional application No. 60/696,665, filed on Jul. 5, 2005, provisional application No. 60/672,813, filed on Apr. 19, 2005, provisional application No. 60/672,254, filed on Apr. 18, 2005, provisional application No. 60/659,356, filed on Mar. 7, 2005, provisional application No. 60/650,499, filed on Feb. 7, 2005.

(51) Int. Cl.
*C21C 7/072* (2006.01)
(52) U.S. Cl. ............................ 266/235; 266/239
(58) Field of Classification Search ............... 266/235, 266/239, 236; 222/590, 591
See application file for complete search history.

(56) References Cited

U.S. PATENT DOCUMENTS

| | | |
|---|---|---|
| 1,865,918 A | 7/1932 | Junkers |
| 2,472,412 A | 6/1949 | Fritz |
| 2,808,782 A | 10/1957 | Thompson et al. |
| 3,048,384 A | 8/1962 | Sweeney et al. |
| 3,272,619 A | 9/1966 | Sweeney et al. |
| 3,291,473 A | 12/1966 | Sweeney et al. |
| 3,836,280 A | 9/1974 | Koch |
| 3,984,234 A | 10/1976 | Claxton et al. |
| 3,997,336 A | 12/1976 | van Linden et al. |
| 4,128,415 A | 12/1978 | van Linden et al. |
| 4,286,985 A | 9/1981 | Van Linden et al. |
| 4,322,245 A | 3/1982 | Claxton |
| 4,351,514 A | 9/1982 | Koch |

(Continued)

OTHER PUBLICATIONS

Three pages containing Figs. 1-4 from U.S. Patent No. 6,019,576 showing pump and impeller sold more than one year before the filing date.

(Continued)

*Primary Examiner*—Scott Kastler
(74) *Attorney, Agent, or Firm*—Pearne & Gordon LLP

(57) ABSTRACT

A vortexer apparatus including a vessel comprising an exterior surface, an interior surface and a mouth for receiving material at an upper end of the interior surface. An outlet passageway extends downwardly from the interior surface. An inlet opening is located between the interior and exterior surfaces above the outlet passageway. The inlet opening is offset from the center line of the interior surface. A pump is adapted to pump fluid into the vessel to form a vortex in the vessel. The base and impeller of the pump are configured and arranged effective to provide molten metal leaving the base with a positive pressure. An outlet conduit extends from the base outlet to near the vessel inlet opening and can be maintained at a temperature above which molten metal solidifies, along it's entire length.

15 Claims, 15 Drawing Sheets

U.S. PATENT DOCUMENTS

| | | | |
|---|---|---|---|
| 4,426,068 | A | 1/1984 | Gimond et al. |
| 4,456,424 | A | 6/1984 | Araoka |
| 4,486,228 | A | 12/1984 | Ormesher |
| 4,491,474 | A | 1/1985 | Ormesher |
| 4,504,392 | A | 3/1985 | Groteke |
| 4,518,424 | A | 5/1985 | Ormesher |
| 4,743,428 | A | 5/1988 | McRae et al. |
| 4,786,230 | A | 11/1988 | Thut |
| 5,203,681 | A | 4/1993 | Cooper |
| 5,268,020 | A | 12/1993 | Claxton |
| 5,540,550 | A | 7/1996 | Kubota |
| 5,586,863 | A | 12/1996 | Gilbert et al. |
| 5,597,289 | A | 1/1997 | Thut |
| 5,622,481 | A | 4/1997 | Thut |
| 5,634,770 | A | 6/1997 | Gilbert et al. |
| 5,716,195 | A | 2/1998 | Thut |
| 5,785,494 | A | 7/1998 | Vild et al. |
| 5,842,832 | A | 12/1998 | Thut |
| 5,951,243 | A | 9/1999 | Cooper |
| 6,019,576 | A | 2/2000 | Thut |
| 6,152,691 | A | 11/2000 | Thut |
| 6,217,823 | B1 | 4/2001 | Vild et al. |
| 6,254,340 | B1 | 7/2001 | Vild et al. |
| 6,303,074 | B1 | 10/2001 | Cooper |
| 6,464,458 | B2 | 10/2002 | Vild et al. |
| 6,524,066 | B2 | 2/2003 | Thut |
| 6,533,535 | B2 | 3/2003 | Thut |
| 6,881,030 | B2 | 4/2005 | Thut |
| 2001/0028846 | A1 | 10/2001 | Vild et al. |
| 2006/0180963 | A1* | 8/2006 | Thut .................... 266/217 |

OTHER PUBLICATIONS

"Bimba Position Feedback Cylinders," Brochure, pp. 7.5-6 (no date).
"Bimba Position Control System," Brochure, pp. 7.25, 7.26, 7.30 (no date).
"Elektrak 205," Brochure by Thomson, © 2003 Danaher Motion, pp. D-26, D-27, D-53 and D-54, Dec. 2003..
Schneider, R., "Working with Position-Feedback Cylinder Technology," http://www.bimba.com/techctr/schneidr.htm, printed May 24, 2005, reprinted from Hydraulics & Pneumatics, Sep. 1996.
Messina, Joseph P., "Pump Handbook," Edited by Karassik, Igor J. et al., pp. 2.213-2.215, no date.

* cited by examiner

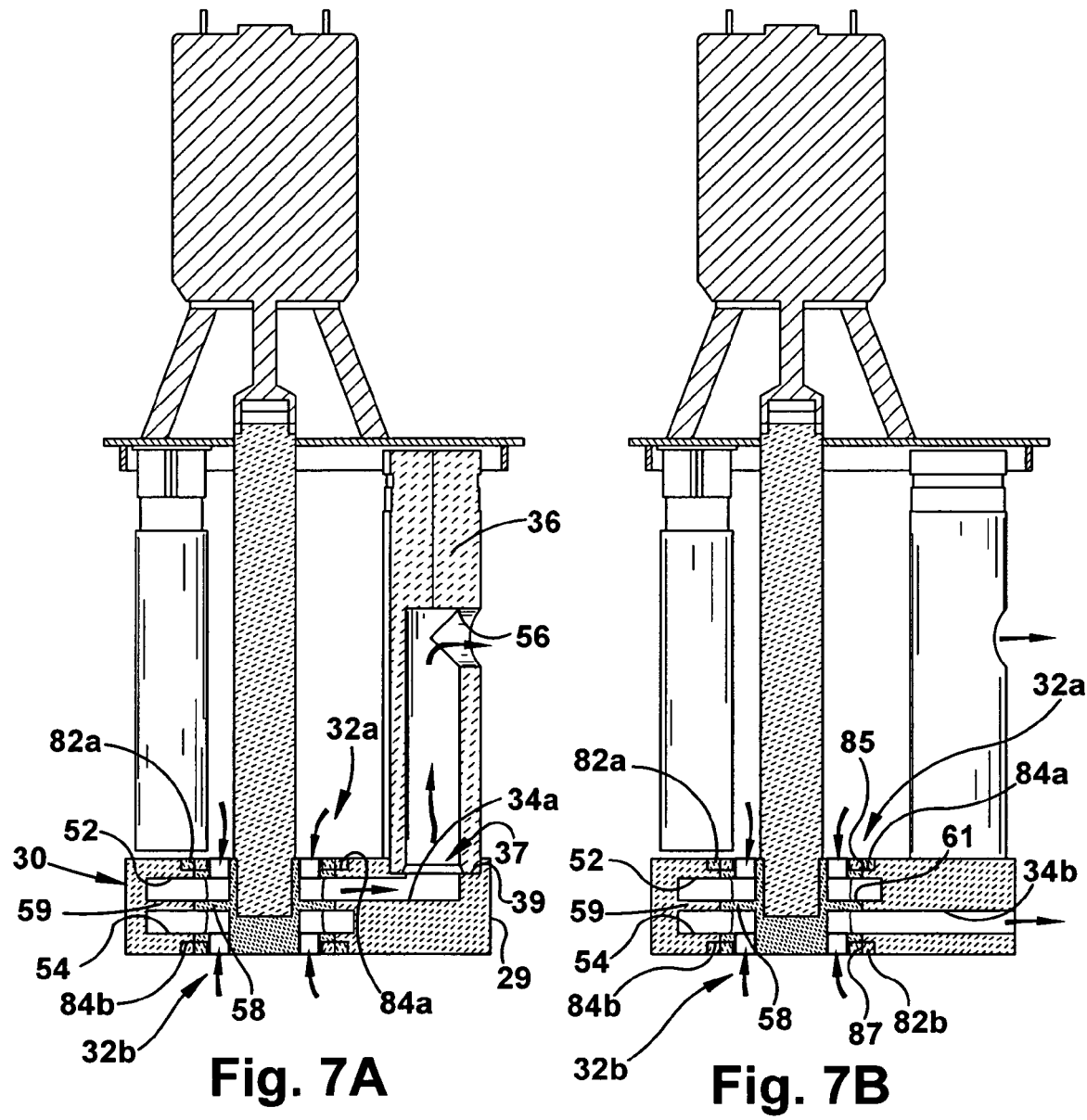

VORTEXER APPARATUS

RELATED APPLICATIONS

This patent application claims benefit of the priority of U.S. provisional patent application Ser. No. 60/696,665 filed Jul. 5, 2005, entitled "Pump Having Infinitely Movable Shaft"; U.S. provisional patent application Ser. No. 60/659,356 filed Mar. 7, 2005, entitled "Multi Functional Pump for Pumping Molten Metal"; U.S. provisional patent application Ser. No. 60/672,254 filed Apr. 18, 2005, entitled "Vortexer System with Integrated Charge Well"; U.S. provisional patent application Ser. No. 60/672,813 filed Apr. 19, 2005, entitled "Vortexer System with Integrated Charge Well"; U.S. provisional patent application Ser. No. 60/650,499 filed Feb. 7, 2005, entitled "Vortexer Apparatus"; and is a continuation-in-part of U.S. Ser. No. 11/292,988 filed Dec. 2, 2005, entitled "Gas Mixing and Dispersement in Pumps for Pumping Molten Metal" currently pending; and is a continuation-in-part of U.S. Ser. No. 11/044,436 filed Jan. 27, 2005, entitled "Impeller for Molten Metal Pump with Reduced Clogging" now U.S. Pat. No. 7,314,348, all of which are incorporated herein by reference in their entireties.

FIELD OF THE INVENTION

The present invention is directed to an apparatus for creating a vortex in a liquid, such as a vortex of molten metal that draws down metal scrap added to the molten metal.

BACKGROUND OF THE INVENTION

Various devices have been used to submerge metal scrap in molten metal. A scrap submerging device can be used in a melting system for converting scrap metal into metal ingots. Molten metal contained in a hearth is circulated by a pump contained in a pump well. In one design, molten metal is drawn from the hearth by the pump and circulated from the pump well to a scrap charging well, to a dross well and back to the hearth. Scrap metal such as aluminum can scrap is added to molten metal in the charge well. It is important to facilitate rapid melting of the scrap, but this is difficult to do because the scrap has a low density causing it to float.

Some devices have mechanical equipment located above a charge well that physically submerges the scrap in the molten metal. Other devices utilize an impeller in the scrap charging vessel to pull the scrap into the molten metal. Yet other devices utilize a pump located outside of the charge well that pumps molten metal into a vessel contained by the charge well without the need for mechanical equipment in the charge well itself.

U.S. Pat. No. 3,272,619 discloses an apparatus for adding solids to liquid, which includes a pump positioned next to a vortexer vessel. A riser of the pump extends outside the molten metal and pumps molten metal onto the surface of the molten metal at a top of the vortex vessel. This is believed to cause undesirable oxidation in view of the exposure of the molten metal to the atmosphere. The U.S. Pat. No. 3,272,619 patent also discloses an apparatus that pumps molten metal into a bottom of the vortex vessel. However, this device employs a riser extending from a base of the pump outside the molten metal, may lead to build up or freezing of molten metal in the riser.

U.S. Pat. No. 6,217,823 discloses using a ramp to achieve a vortex with an initially upward flow of molten metal adjacent outer walls inside the scrap charging vessel and then downwardly toward an outlet of the vessel. The U.S. Pat. No. 6,217,823 patent contrasts its invention from a downward flow scrap submergence apparatus disclosed in U.S. Pat. No. 4,286,985. The apparatus of the U.S. Pat. No. 4,286,985 patent includes an upper well inlet and a bottom well outlet positioned to create a downward flow of molten metal adjacent the side wall of the well to form the vortex. Moreover, the device described in the U.S. Pat. No. 4,286,985 patent disclosure requires two interconnected inlet passages into the scrap charging well, one at the surface of the molten metal and one beneath the level of the molten metal. The device of the U.S. Pat. No. 4,286,985 patent disclosure operates based on suction or negative pressure. The device of the U.S. Pat. No. 4,286,985 patent disclosure uses a specially shaped pump well into which an impeller on the end of a shaft is rotated in a chamber. The U.S. Pat. No. 4,286,985 patent discloses that an inlet, the first surface passage, the second, below-surface passage, the pump well and the charge well are formed in the same block of material, which prevents separate cleaning and repair of the pump well and charge well.

DISCLOSURE OF THE INVENTION

The present invention features a vortexer apparatus and, in particular, a scrap submergence apparatus used to melt scrap metal in molten metal (e.g., aluminum can scrap in molten aluminum). Molten metal contained in a hearth is caused to circulate by a pump. In one furnace design, molten metal is drawn from the hearth by the pump and caused to circulate from a pump well to a scrap charging well, to a dross well and back to the hearth. Scrap metal is added to molten metal in the charge well. It is important to facilitate rapid melting of the scrap, but this is difficult to achieve because the scrap has a low density causing it to float.

One embodiment of the present invention features a vortexer apparatus that facilitates submergence and melting of metal scrap in molten metal. The vortexer apparatus includes a scrap charge vessel into which the scrap is added to molten metal contained therein, which includes an exterior surface, an interior surface containing molten metal and forming a mouth at an upper end portion, an outlet passageway located near a lower portion of the vessel, and an inlet opening extending between the exterior and interior surfaces of the vessel below the surface of the molten metal contained in the vessel and above the outlet passageway. Molten metal enters the vessel from the inlet opening, in particular, at a location substantially tangential to the interior surface of the vessel. The vessel wall may have a circular, oval or other shape as seen from a top view, and may be vertical, bowl-shaped or conical as seen in a vertical cross-sectional view. Molten metal leaves the vessel through the outlet passageway near the bottom of the vessel. A pump is used for pumping molten metal into the vessel, which includes a shaft driven by a motor at an upper end, an impeller connected to the lower end of the shaft, a base including an impeller chamber in which the impeller is rotatable, an inlet into the impeller chamber of the base and an outlet conduit (e.g., the riser of a transfer pump). Molten metal travels from the impeller chamber to the outlet conduit, which extends from the base to near the inlet opening of the charge vessel. The outlet conduit advantageously can be maintained at a temperature above the temperature at which molten metal solidifies, along the entire length of the outlet conduit. The pump is removable from the pump well for cleaning and repair. All components of the vortexer apparatus that are subjected to the molten metal environment are constructed of refractory material such as graphite or silicon carbide.

Molten metal is drawn into the base of the pump by rotation of the impeller in the impeller chamber, leaves the base and travels through the outlet conduit. Molten metal travels from the outlet conduit of the pump and through the inlet opening into the charge vessel. The direction of flow of the molten metal from the outlet conduit into the charge vessel creates a vortex flow of molten metal in the vessel. The vortex flow of molten metal effectively pulls scrap introduced in the charge vessel down into the molten metal along the vortex flow path. The molten metal travels downwardly through the outlet passageway of the vessel. The molten metal then travels from the charge vessel to the next destination in the melting process, for example, a dross well or hearth.

Many variations are possible in the present invention without departing from its spirit and scope. For example, the outlet conduit of the pump may be placed so as to introduce molten metal tangentially into a cylindrical charge vessel having a circular cross-section. The vessel may include a vertical interior surface with conical portions. For example, the vessel can be cylindrical and can include a conical section between the interior surface and the outlet passageway in a direction of the central axis of the vessel, which necks down in size from the interior surface to the outlet passageway. The outlet passageway can be downwardly inclined to permit the exit of molten metal from the bottom of the vessel. The inlet opening can be located at different heights along the wall of the vessel and can be directed horizontally or downwardly. In a particular design, the vessel includes a cylindrical interior surface; the molten metal from the outlet conduit of the pump is introduced tangentially into the vessel inlet passageway below the molten metal surface and the vessel outlet passageway extends below the inlet passageway near the bottom of the vessel at a declining slope toward the exterior of the vessel.

In the present invention, no apparatus with moving mechanical parts is needed to force scrap into the molten metal in the charge well. In addition, no ramp is used to achieve a vortex with an initially upward flow of molten metal adjacent outer walls in the feed bay and then downwardly toward an outlet as described in U.S. Pat. No. 6,217,823. The apparatus of the present invention includes an upper inlet offset from a center line of the vessel and a bottom outlet positioned to create a downward flow of molten metal to form the vortex. The U.S. Pat. No. 6,217,823 patent disclosure contrasts its device from such a downward flow design. The device of the U.S. Pat. No. 6,217,823 patent is disadvantageous in that all of the molten metal is introduced into the charge vessel, which exposes the molten metal to excessive oxygen. In contrast, the present invention is able to direct molten metal along a circulation passageway in the charge vessel. While not wanting to be bound by theory this is expected to result in cleaner molten metal due to less oxidation. Molten metal may be directed only along the circulation passageway at times when no scrap is being charged into the charge well as disclosed in U.S. patent applications Ser. No. 60/696,665, entitled "Pump Having Infinitely Movable Shaft," and Ser. No. 60/659,356, entitled "Pump Having Movable Shaft" (hereinafter the "Pump Having Movable Shaft Applications"), which are incorporated herein by reference in their entireties.

Moreover, the present invention is different from the device described in the U.S. Pat. No. 4,286,985 patent disclosure. That device uses two interconnected inlet passages into the scrap charge vessel, one at the surface of the molten metal and one beneath the level of the molten metal. The present invention does not include a passage at the surface of the molten metal because this disadvantageously exposes more molten metal to the atmosphere and increases oxidation of the metal.

In addition, the device of the U.S. Pat. No. 4,286,985 patent disclosure operates based on suction or negative pressure in contrast to the inventive pump which operates more efficiently based on positive pressure. The inventive pump employs a base and optional volute chamber in which the impeller rotates and a removable outlet conduit for directing the molten metal from the impeller chamber to the inlet opening of the charge well. All of these features are lacking in the device of the U.S. Pat. No. 4,286,985 patent disclosure. The device of the U.S. Pat. No. 4,286,985 patent disclosure requires a specially shaped pump well into which an impeller on the end of a shaft is rotated, with an inlet, the first surface passage, the second, below-surface passage, the pump well and the charge well being formed from the same block of material, which complicates the construction, repair and cleaning of that scrap submergence system compared to the present invention.

The pump used in the present invention may optionally include two impeller chambers. A first inlet opening leads to the first impeller chamber and a first outlet passageway leads from that impeller chamber to an exterior surface of the base. The first outlet passageway communicates with a circulation passageway extending below the wall of the charge vessel, which may intersect the outlet passageway of the charge vessel and lead to the next chamber. A second inlet opening may lead to the second impeller chamber and a second outlet passageway (e.g., the outlet conduit or riser) leads from that impeller chamber to the inlet of the charge vessel.

One or two impellers are rotated in the pump base. Two separate impellers could be rotated on a shaft, one in each impeller chamber. The impeller chambers are coaxial. A web opening about the same diameter as the impeller is located in a wall or web disposed between the impeller chambers transverse to the rotational impeller axis and can be nearly the same size as the impeller diameter and aligned with upper and lower circular inlet openings in the base. Each impeller includes an inlet near an end portion and an outlet near a side of the impeller. In particular, each impeller includes an end plate near the web separating the impeller chambers. Alternatively, a baffle impeller having a central imperforate baffle could be used. The baffle is positioned near the web between the first and second impeller chambers effective to substantially separate the molten metal in the two chambers. The impeller with baffle plate includes a first inlet near one end portion, a first outlet near a side of the impeller, a second inlet near the other end portion and a second outlet near a side of the impeller, the first and second outlets being spaced apart by the baffle in a direction of the rotational impeller axis.

Rotation of the two impellers or single impeller with two impeller members, on the end of the shaft draws molten metal into both impeller chambers, into the impeller inlets, out through the impeller outlets, and to the respective outlets of the base. Thus, the pump causes molten metal simultaneously to flow into the charge vessel, creating the vortex in the vessel, and to flow into the circulation passageway of the charge vessel. While not wanting to be bound by theory, the flow of molten metal from one of the impeller chambers, along the circulation passageway in fluid communication with the outlet passageway of the charge vessel, may tend to draw molten metal from the charge vessel and augment the vortex effect. It will be appreciated that the invention contemplates regulating the dual impeller chamber pump or selecting a single or dual impeller chamber pump, so as to direct molten metal to a single discharge location, such as only to the circulation passageway when no scrap is being charged into the charge vessel, as disclosed in the Pump Having Movable Shaft Applications.

The present invention also features the dual impeller chamber pump itself, apart from use in connection with the inventive vortexer apparatus. Such a pump could be used as a discharge pump, transfer pump or other pump known in the art. In the case of a discharge pump, a riser would not be needed, which would be apparent to those skilled in the art in view of this disclosure. The dual impeller chamber pump of the present invention enables molten metal to be directed to two locations: two discharge locations, one discharge and one transfer location and two transfer locations. In addition, the flow through each outlet passageway from each respective impeller chamber can be selectively controlled to select discharge from one or the other or both base outlet passageways. Another embodiment of the inventive pump with dual impeller chambers directs molten metal from both impeller chambers to a common discharge passageway in the base of the pump and then to the exterior of the pump, as disclosed in the Pump Having Movable Shaft Applications (e.g., top and bottom feed pump with dual intake, non-baffled impeller).

The inventive pump may include all of the features described herein and further variations. For example, the pump could include one, two or more impellers on the shaft. One preferred impeller is the baffle impeller with dual intake, described herein which may employ vanes or passages. The vanes or passages can be modified as disclosed in U.S. patent application Ser. No. 11/044,436, entitled "IMPELLER FOR MOLTEN METAL PUMP WITH REDUCED CLOGGING," (hereafter the "Dual Intake Impeller Application"), which is incorporated herein by reference in its entirety. The baffle impeller itself forms a separate inventive component apart from use in connection with a particular pump or the vortexer apparatus. Other impellers that may be suitable for use in the present invention (vortexer apparatus and/or dual impeller chamber pump) include those described in the Dual Intake Impeller Application and other conventional vaned or barrel type of impellers. However, a suitable seal between the impeller chambers, or tight clearance between the impeller and the web, may be needed when using the impellers described in the Dual Intake Impeller Applications depending on the function of the pump.

One pump in accordance with the present invention features both impeller chambers as volutes (i.e., a dual volute pump) and the use of the baffle impeller. Gas may be introduced near or into one or both impeller chambers in accordance with the invention, as disclosed in U.S. patent application Ser. No. 11/292,988, entitled "Gas Mixing and Dispersement in Pumps for Pumping Molten Metal" (hereinafter "Gas Dispersement Application"), which is incorporated herein by reference in its entirety.

It should be apparent that while the present invention is preferably used in connection with melting scrap in molten metal (e.g., molten aluminum or magnesium), it may be used in other processes that do not involve molten metal to facilitate adding material (e.g., solids) to liquids with improved mixing. For example the vortexer apparatus of the invention could be used to add wood pulp to certain liquors in the pulp and paper industry. Also, flux material may be added to the molten metal using the inventive vortexer apparatus.

Another embodiment of the invention features a vortexer apparatus with an integrated furnace chamber (e.g., charge well). Metal scrap or other material is added to molten metal contained in the charge well instead of to the vortexer vessel described above. The charge well includes a wall formed of refractory material such as brick. An outlet passageway is located in the wall. The outlet passageway may be located near a lower portion of the charge well leading to another chamber such as a dross well or hearth. A separating wall (e.g., the front wall of the chamber) is located between an upstream chamber (e.g., a pump well) and the charge well and is formed of a refractory material such as brick. An inlet passageway located below the molten metal surface is located in the separating wall and extends to the interior surface of the charge well. The inlet passageway is located above the outlet passageway and offset from a center line of the chamber in top view. In particular, the inlet passageway of the separating wall is located close to a side wall of the chamber, for example, generally tangential to the side wall. The interior charge well surface may have a rectangular, square, circular, oval or other shape as seen from a top view, and may be vertical, arcuate, conical or other shape as seen in a vertical cross-sectional view. Molten metal leaves the charge well through the outlet passageway in the lower half of the charge well.

A pump is adapted to pump molten metal into the charge well to form a vortex of molten metal therein. One aspect of the pump includes a shaft driven by a motor at an upper end, an impeller connected to the lower end of the shaft, a base including an impeller chamber in which the impeller is rotatable, and at least one base inlet opening and at least one base outlet opening or passageway in communication with the impeller chamber of the base. The impeller chamber preferably includes a wall that forms a volute in which the impeller rotates. The base is constructed and arranged to permit molten metal to be pumped from the base outlet opening to near the charge well inlet passageway. For example, an outlet conduit (e.g., modified "riser" of a transfer pump) extends from the outlet opening to near the entrance of the charge well inlet passageway and is completely submerged during pumping. This riser may contact both the base and the separating wall at opposite ends of the riser. The pump is removable from the molten metal for cleaning and repair. All components of the vortexer apparatus that are subjected to a molten metal environment are constructed of heat-resistant materials such as refractory furnace brick, graphite or silicon carbide.

Molten metal is drawn into the base inlet by rotation of the impeller in the impeller chamber, leaves the impeller chamber through the base outlet opening and travels through the outlet conduit. Molten metal then travels through the charge well inlet passageway into the charge well. The direction of flow of the molten metal along the charge well inlet passageway and into the interior volume of the charge well, creates a vortex of molten metal inside the charge well. The vortex apparatus operates effectively when the charge well inlet passageway extends generally tangentially to the interior surface of the charge well, as seen in a top view. Reference to tangentially does not require exact alignment of flow between the charge well inlet passageway and the adjacent side wall of the charge well, but connotes circulating molten metal flow along the side walls and separating wall that causes a vortex. The vortex flow of molten metal effectively pulls scrap introduced in the charge well inlet passageway down into the molten metal of the charge well along a vortex flow path and out the charge well outlet passageway. The molten metal and any unmelted scrap travel downwardly through the outlet passageway of the charge well and then to the next destination in the melting process, such as to a dross well or hearth. The hearth is typically an enclosed chamber heated by burners containing most of the volume of molten metal and from which molten metal or solid metal is fed and molten metal is pumped.

An advantage of this embodiment of the present invention featuring the integrated charge well is that a separate vessel need not be disposed inside the charge well. The vortex flow of molten metal occurs in the charge well itself formed by the walls of the charge well including the separating wall between the pump well and charge well, which are formed of refractory brick. The present invention permits retrofitting existing rectangular charge wells including configuring and positioning optional corner inserts of a desired shape and size. In this case, the charge well inlet passageway is suitably sized and located to receive the riser from the pump or an adapter fastened to the riser. An adapter forms a conduit for direct fluid flow from the pump into the charge well or vessel. An existing passageway or archway in the separating wall between the pump well and the charge well is plugged (e.g., using brick and mortar or cement). A new charge well inlet passageway is configured and positioned effective to receive the riser offset from a center reference line of the charge well. The optional corner inserts are cemented into the corners of the charge well to provide the charge well with a desired shape such as an oval or generally circular shape in top view. Each of the corner inserts has exterior corner surfaces orthogonal to each other and an interior surface extending between the exterior surfaces. The corner inserts can have a triangular shape in top view. The corner inserts may include an interior surface that is flat or arcuate so as to provide a rectangular charge well with an oval or generally circular shape. The corner inserts may be formed of cast refractory material. On the other hand, the charge well of new furnace construction could be configured to be oval or circular with an offset charge well inlet opening, in accordance with the present invention. In that case, the corner inserts would not be needed.

Many variations to the second embodiment of the present invention are possible without departing from its spirit and scope. For example, the transfer conduit of the pump and the charge well inlet passageway may be placed so as to introduce molten metal tangentially into a generally cylindrical charge well. The interior of the charge well may include a vertically extending interior surface or conical portions. For example, the interior surface of the charge well could be cylindrical. The charge well inlet passageway could be located at different heights along the separating wall and could be directed horizontally or downwardly, for example. In a particular design, the charge well includes an oval interior surface and the molten metal from the charge well inlet passageway is introduced tangentially with respect to the charge well interior surface as seen in a top view.

With regard to further variations of the invention, rather than a base outlet passageway that extends from the impeller chamber to an exterior surface of the base and is in fluid communication with a transfer riser that leads to near the charge well inlet passageway, the invention may include a single outlet passageway extending directly from the impeller chamber to near the charge well inlet passageway. This passageway may be in the form of a conduit leading directly from the impeller chamber. Alternatively, the pump base could include a block of material having a passageway formed therein extending from the impeller chamber to near the charge well inlet opening, instead of a riser extending between the base and charge well inlet passageway. In these cases the pump base is separate from the vessel for cleaning and repair. One aspect of the invention includes a discharge passageway extending from the impeller chamber toward an exterior surface of the base, and a conduit in fluid communication with the discharge passageway having one end portion in contact with the base and another end portion in contact with the separating wall and in fluid communication with the charge well inlet passageway. This avoids inefficiencies caused by backflow in the pumping chamber.

The furnace may have many variations as known to those skilled in the art. For example, a dross well may be located downstream of the charge well. Alternatively, the dross well may be omitted. Dross may be skimmed from the molten metal in the enclosed main hearth and the charge well may communicate directly with the main hearth. Dross may be skimmed from the charge well instead of or in addition to the main hearth.

In all aspects of the present invention gas may be introduced near or into the impeller chamber or the charge well, as disclosed in the Gas Dispersement Application. Various chemically reactive and inert gases may be introduced into the molten metal including chlorine-containing gas, nitrogen and argon for purposes known to those skilled in the art.

It should be apparent that while the present invention is preferably used in connection with melting scrap in molten metal, other material besides scrap may be added to the vortex flow of molten metal in the charge well as described above.

The pump may be designed to have a large theoretical pumping capacity, for example, 25 tons per minute at 900 rpm, which is expected to provide a strong vortex and possibly also a significantly raised molten metal level, in the charge well or charge vessel.

Many additional features, advantages and a fuller understanding of the invention will be had from the accompanying drawings and the detailed description that follows. It should be understood that the above Disclosure of the Invention describes the invention in broad terms while the following Detailed Description describes the invention more narrowly and presents embodiments that should not be construed as necessary limitations of the broad invention as defined in the claims.

BRIEF DESCRIPTION OF THE DRAWINGS

FIGS. 7A and 7B are vertical cross-sectional views of the pump of FIG. 4;

DETAILED DESCRIPTION

Figure 1:
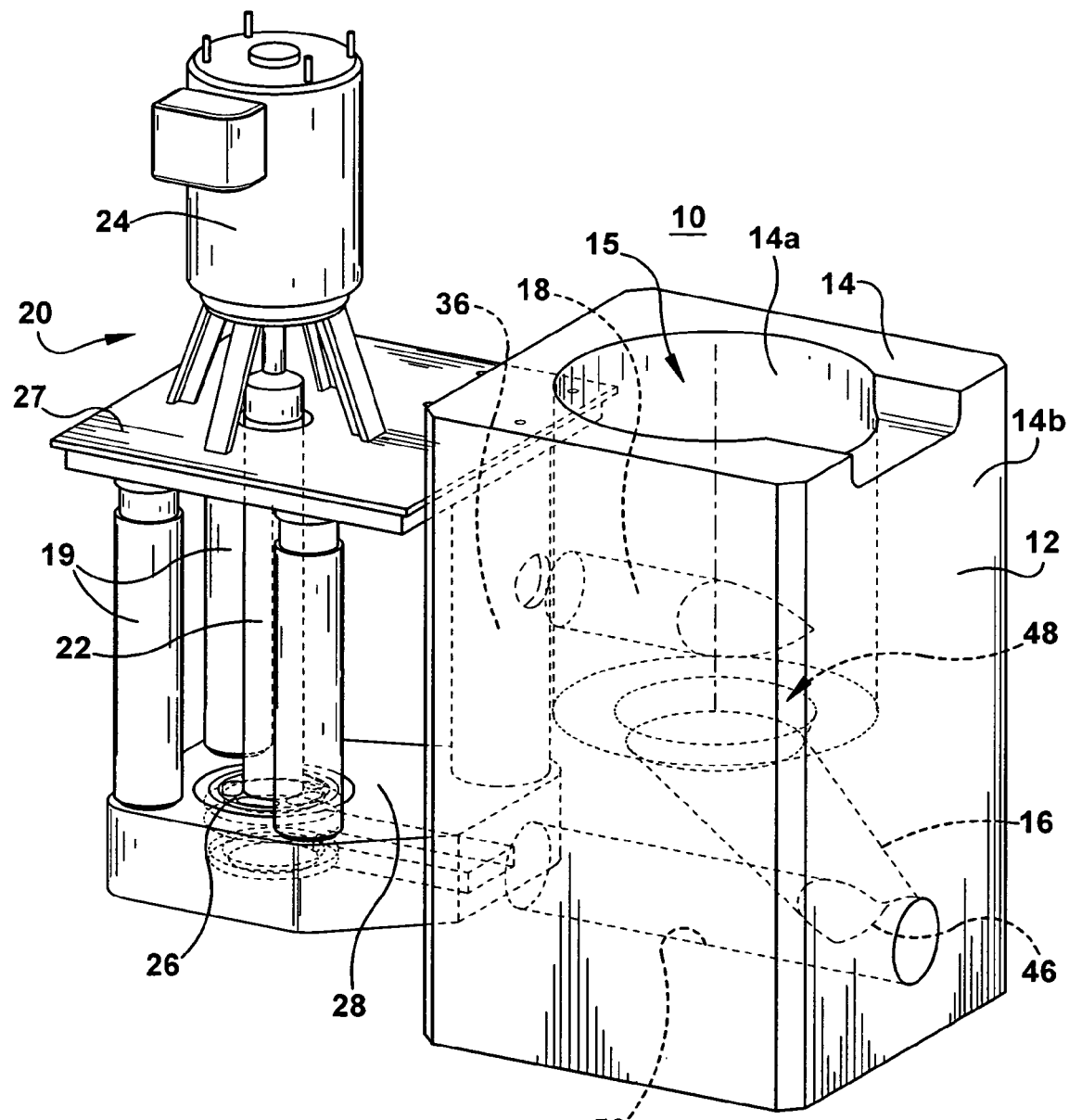
FIG. 1 is a perspective view of a vortexer apparatus constructed in accordance with the present invention.
Figure 2:
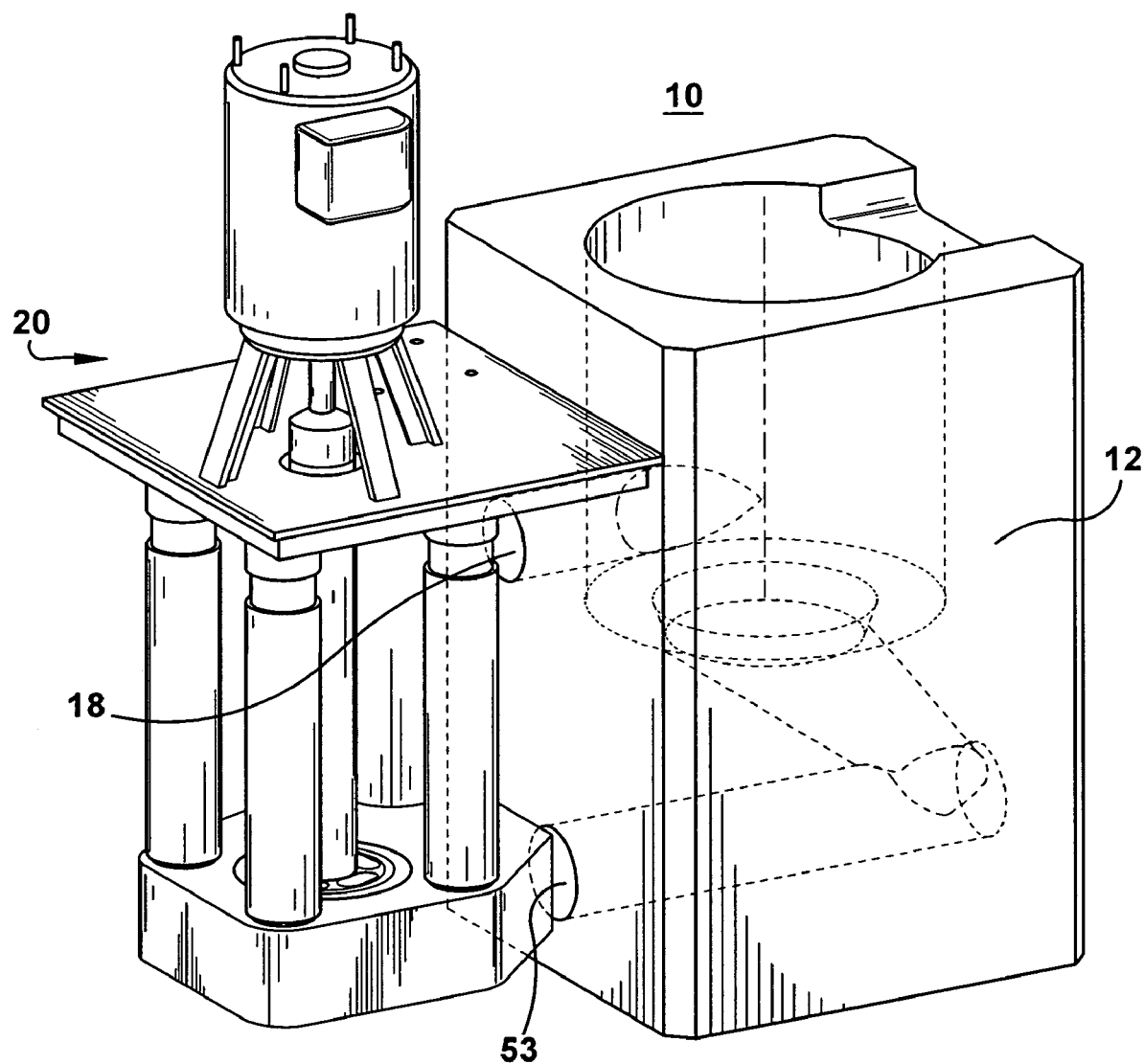
FIG. 2 is another view of the vortexer apparatus of FIG. 1.
Figure 3:
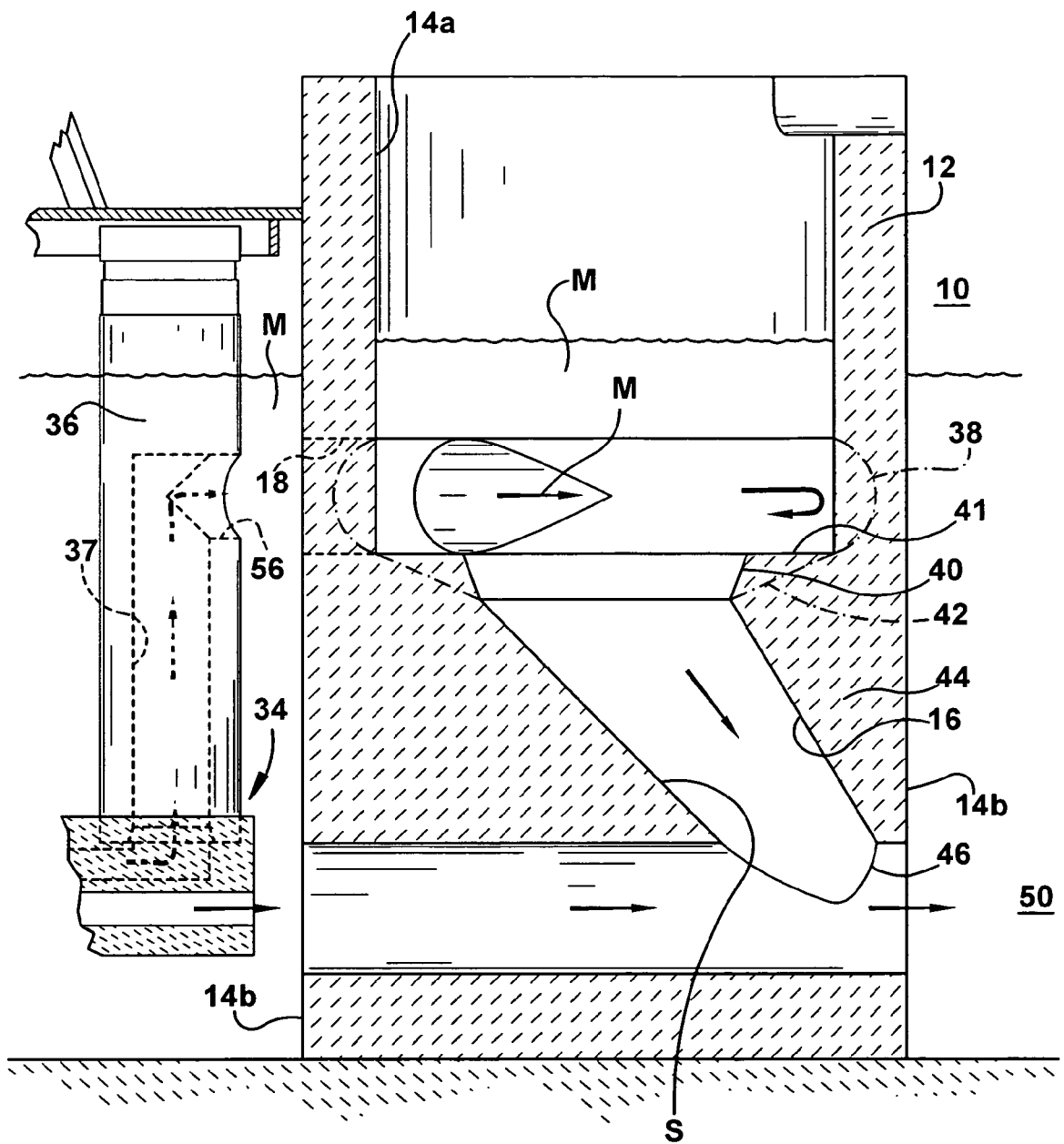
FIG. 3 is a vertical cross-sectional view of the vortexer apparatus of FIG. 1.
Figure 4:
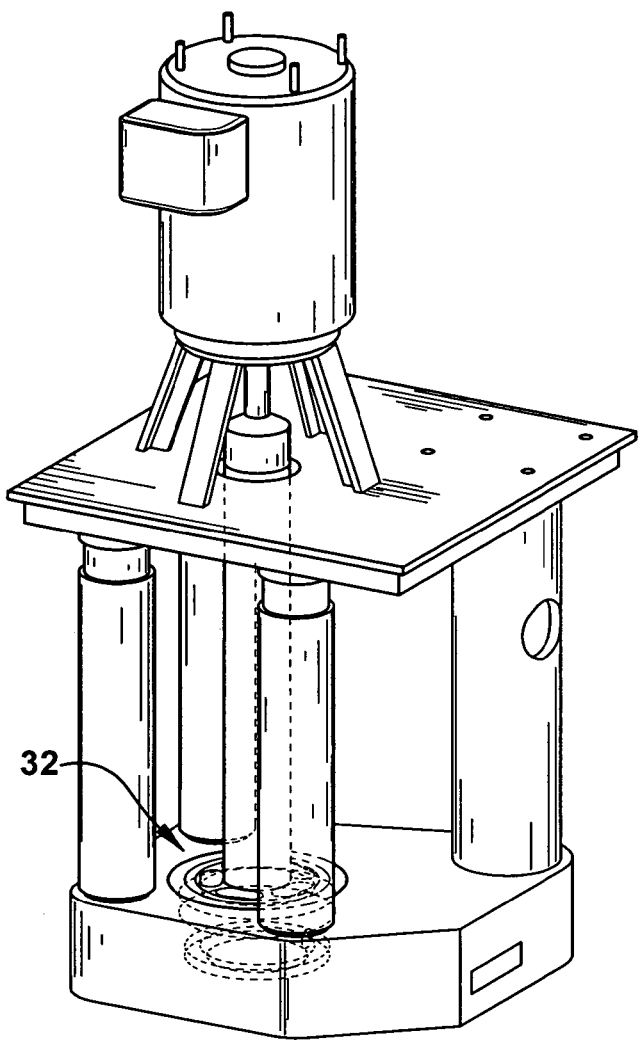
FIG. 4 is a view of a pump used in the vortexer apparatus of FIG. 1.
Figure 5:
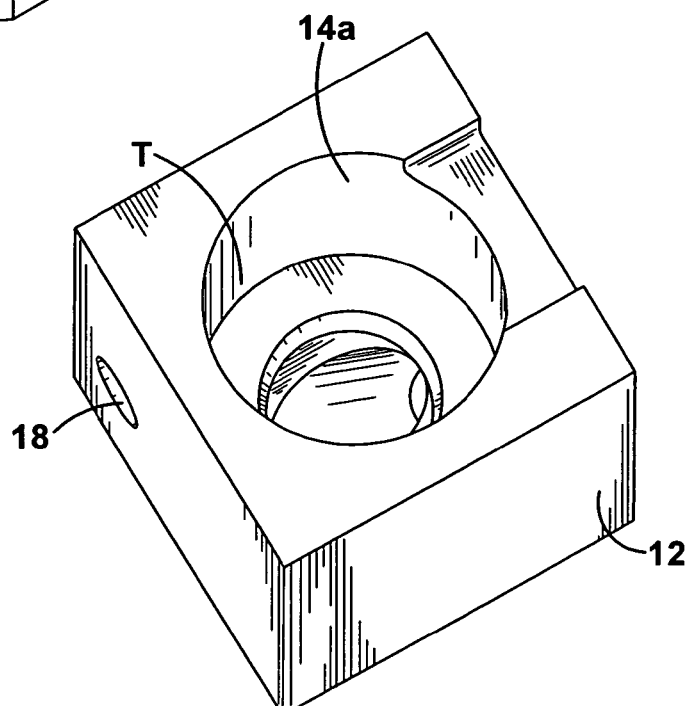
FIG. 5 is a perspective view of a vortexer vessel used in the vortexer apparatus of FIG. 1.
Figure 6:
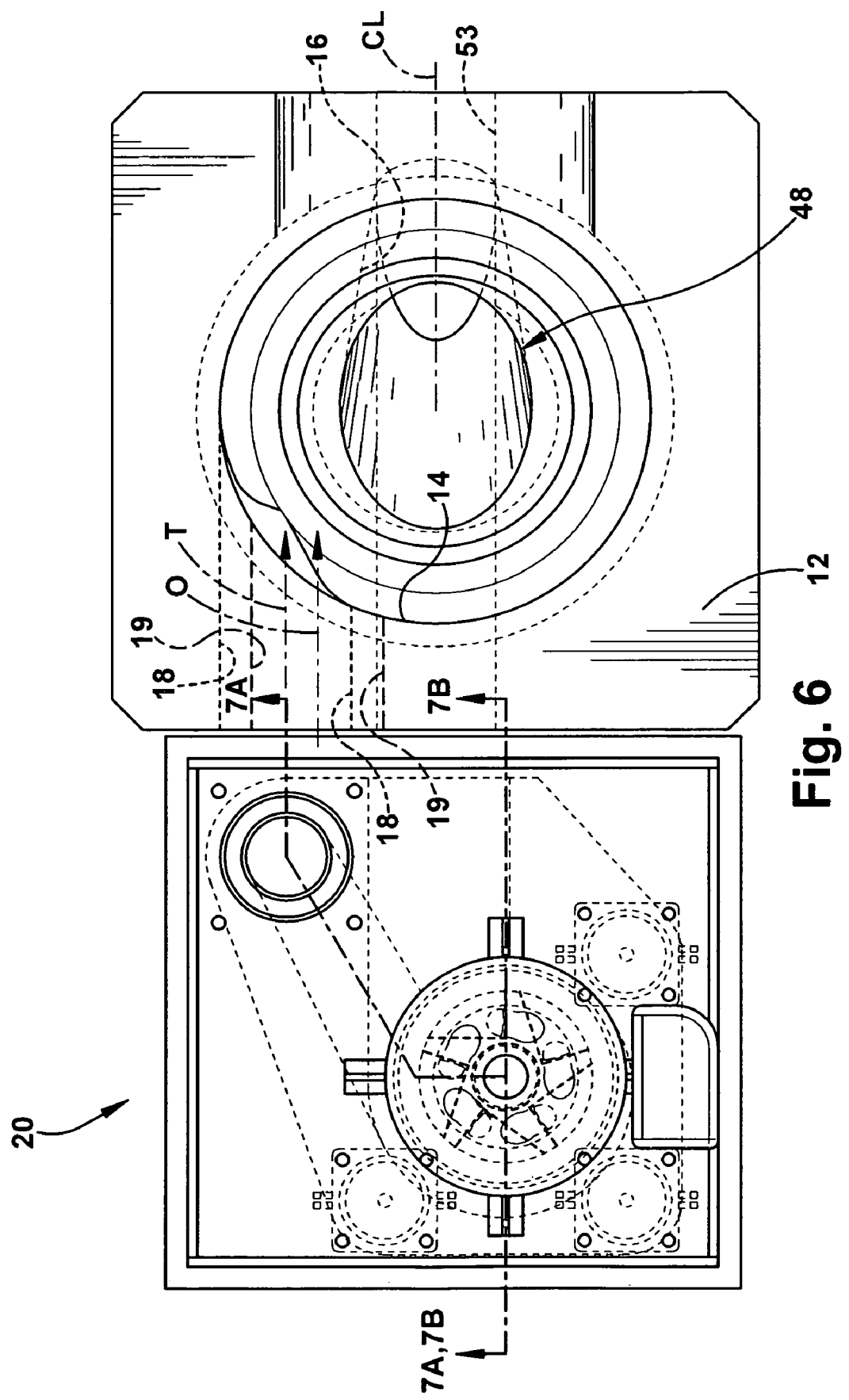
FIG. 6 is a top plan view of the vortexer apparatus of FIG. 1.
Figure 8A:
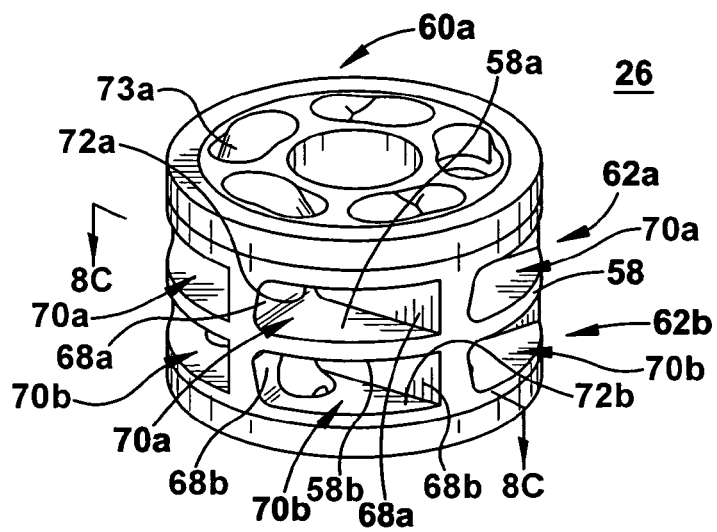
FIGS. 8A-8E are views of a vaned baffle impeller constructed in accordance with the present invention and suitable for use in the inventive vortexer apparatus.
Figure 8B:
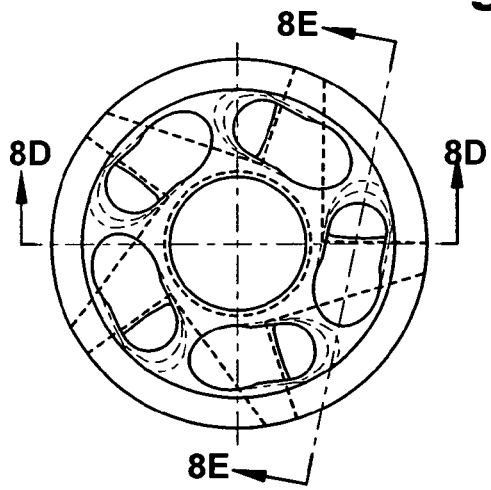
Figure 8C:
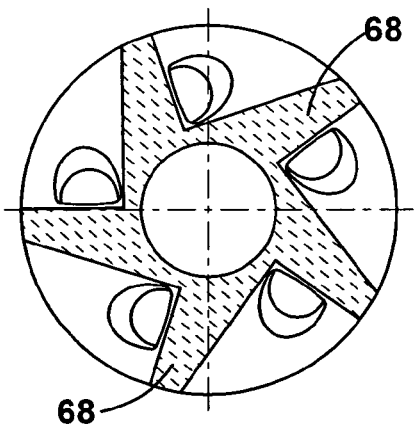
Figure 8D:
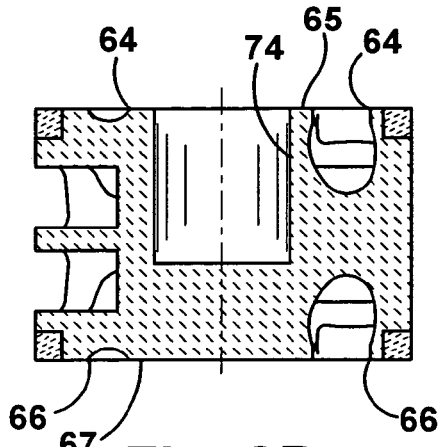
Figure 8E:
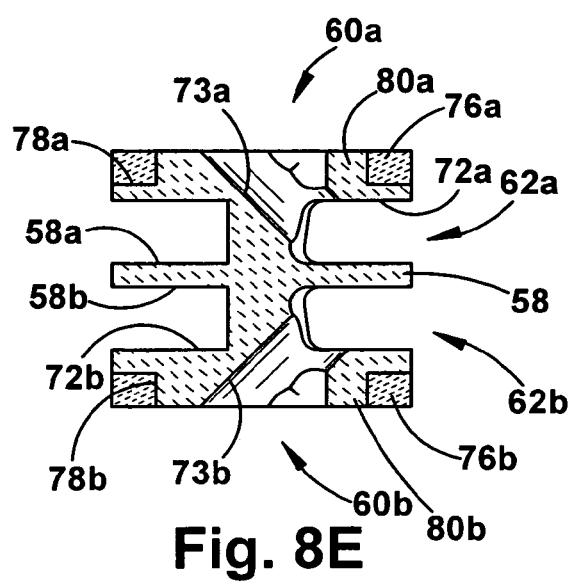

Vortexer Apparatus with Charge Well Vessel:

Referring to the drawings, the vortexer apparatus 10 includes a vortexer or charge vessel 12 formed from a block of refractory material and having a side wall 14, an outlet passageway 16 located near a lower portion of the vessel and an inlet passageway 18 in the side wall of the vessel located below the surface of molten metal contained in the vessel and above the outlet passageway. Molten metal M enters the vessel from the inlet passageway 18 at a location O offset from a central axis CL of the vessel and, in particular, at a location T tangential to the interior surface 14a of the vessel (FIGS. 3, 5 and 6). The vessel inlet passageway 18 can be moved closer to the center line CL if the offset location O is used instead of the tangential location T. The vessel inlet passageway is shown by dotted lines 19 in the position O. The vessel 12 is cylindrical in this exemplary design as seen from a top view. Molten metal leaves the vessel through the outlet passageway near the bottom of the vessel.

In particular, the vessel has an interior surface 14a that contains molten metal in the vessel and an exterior surface 14b. The upper portion of the interior surface 14a forms a mouth 15 configured to receive metal scrap. The outlet passageway 16 extends downwardly from the interior surface 14a.

A pump 20 for pumping molten metal into the vessel includes a shaft 22 driven by a motor 24 at an upper end, an impeller 26 connected to the lower end of the shaft, a base 28 including an impeller chamber 30 (FIG. 7) in which the impeller is rotatable, an inlet 32 in the base, an outlet 34 in the base and an outlet conduit or riser 36 extending from the base to near the inlet passageway 18 of the vessel. The motor is supported outside the molten metal by a motor mount 27 as known in the art. Support posts 19 extend between the base and motor mount for submerging the base in the molten metal in a known manner. The riser 36 extends from the base to the motor mount. The support posts 19 and riser 36 are removably fastened by clamps at their upper ends to the motor mount and cemented at their lower ends to the base in a known manner. The passageway 37 in the riser extends to approximately the same vertical height as the vessel inlet opening and is completely submerged in molten metal.

Molten metal is drawn into the base of the pump by rotation of the impeller in the impeller chamber, leaves the base and travels through the riser. Molten metal leaves the pump having a positive pressure. As shown in FIG. 3, molten metal travels from the riser passageway 37 through the inlet passageway 18 into the charge vessel 12. The direction of flow of the molten metal from the outlet conduit into the vessel creates a vortex flow of molten metal in the vessel. At a location where the molten metal enters the vessel the wall can be shaped such as with annular groove 38 to enhance the vortex flow (FIG. 3). The molten metal entering the vessel travels downwardly in a vortex toward the outlet passageway 16. The vortex flow of molten metal efficiently pulls scrap down into the charge well along the vortex flow path. Molten metal travels through the outlet passageway 16 of the vessel and then travels to the next destination (e.g., dross well or hearth).

The vessel includes an optional conical portion 40 (FIG. 3) between the floor 41 and the outlet passageway at the bottom of the vessel. A conical portion 42 can optionally extend from the interior surface 14a or groove 38 to the vessel outlet passageway as represented by dotted lines. The outlet passageway 16 permits the exit of molten metal from the bottom 44 of the vessel at outlet opening 46. At a location of intersection 48 of the outlet passageway with the interior surface 14a of the charge vessel (FIG. 6), the outlet passageway is concentric with the vessel wall near the bottom of the vessel. The outlet passageway travels at a declining slope S ranging, for example, from 30 to 60 degrees from a vertical axis, toward the exterior of the vessel into fluid communication with a circulation passageway 53 that extends between exterior surfaces 14b at different locations of the vessel.

As shown in FIG. 7A, 7B, the pump includes upper and lower impeller chambers 52, 54. In particular, the impeller chambers both include a wall that forms a volute. The term volute has its ordinary meaning and generally refers to a spiral shaped opening that improves pumping efficiency compared to rotating an impeller in the center of a generally cylindrical volume. Inlet 32a leads to upper impeller chamber 52 and outlet passage 34a leads from that impeller chamber. The riser passageway 37 extends from passage 34a toward the inlet passageway 18 of the vessel. The riser has an outlet opening 56 (FIG. 7A) near or in contact with the vessel in alignment with the vessel inlet passageway 18. Inlet 32b leads to lower impeller chamber 52 and discharge passageway 34b leads from that impeller chamber toward an exterior surface of the base. The discharge passageway 34b extends near the circulation passageway 53. The base can include only an upper base inlet opening 85 and upper intake impeller, only a lower base inlet opening 87 and lower intake impeller or both upper and lower base inlet openings 85, 87 and an impeller with dual (upper and lower) intake as disclosed in the Dual Intake Impeller Application or the baffle impeller disclosed herein.

The base inlet opening may be obturated by an optional base inlet sleeve located around the shaft and having openings sized smaller than particles intended to be kept out of the base as known in the art. The base inlet opening leads to the impeller chamber and the base discharge passageway leads from the impeller chamber toward an exterior surface 29 of the base. A socket 37 is formed in the base in communication with the discharge passageway. The riser is secured on a shoulder 39 of the socket from which it extends toward the inlet passageway of the vessel.

In the particular design shown in FIGS. 7 and 8, one impeller 26 is mounted to the shaft and includes a baffle plate 58 vertically aligned with a wall or web 59 located in the base between the first and second impeller chambers transverse to the rotational axis of the impeller effective to substantially prevent flow of molten metal between the impeller chambers. The web includes a circular web opening 61 that receives the cylindrical impeller at close tolerance. While not wanting to be bound by theory, absolute isolation of fluid communication between the impeller chambers may not be required in the present invention. Other impellers besides the baffle impeller shown may be used including those impeller disclosed in the Dual Intake Impeller Application. Reference herein to "impeller member" means a portion of a single impeller or one of two or more separate impellers on the same shaft.

Referring to FIGS. 8A-8E, the baffle impeller includes an upper inlet 60a near an upper end portion, an upper outlet 62a near a side of the impeller, a lower inlet 60b near the lower end portion and a lower outlet 62b near the side of the impeller. The impeller may be vaned or a barrel type impeller with passages, and can be modified as disclosed in the Dual Intake Impeller Application. The particular impeller shown in FIG. 8 is a vaned impeller. The impeller includes a plurality of upper inlet openings 64 in upper end face 65 and a plurality of lower inlet openings 66 in lower end face 67. Vanes 68 extend between each end plate and the baffle plate 58. Upper cavities 70a are formed between adjacent upper vanes 68a, upper baffle plate surface 58a and the interior surface 72a of the upper plate. Lower cavities 70b are formed between adjacent lower vanes 68b, lower baffle plate surface 58b and interior surface 72b of the lower plate. Passages 73a interconnect each of the upper inlet openings 64 and a corresponding upper cavity 70a. Passages 73b interconnect each of the lower inlet openings 66 and a corresponding lower cavity 70b. Other variations in the design of the baffle impeller may be made as described in the Dual Intake Impeller Application, including variations in the number, shape and location of inlets, outlets, vanes and passages. The shaft is mounted in opening 74 of the impeller in a known manner. Upper and lower bearing rings 76a, 76b are mounted onto respective shoulders 78a, 78b formed in base plates 80a, 80b of the impeller. Corresponding upper and lower base bearing rings 82a, 82b are mounted onto shoulders 84a, 84b around the respective circular inlet openings 85, 87 of the base, which are aligned with web opening 61.

Rotation of the impeller on the end of the shaft draws molten metal into both impeller chambers, into the upper and lower impeller inlets 60a, 60b and inlet openings 64 and 66, along upper and lower interior impeller passages 73a, 73b, into the upper and lower cavities 70a and 70b, through the upper and lower impeller outlets 62a, 62b, and to the respective outlet passages 34a, 34b from each impeller chamber. Thus, molten metal is simultaneously caused to flow into the vessel inlet and along the circulation passageway 53 into communication with the outlet passageway 16. The former flow path causes the vortex flow of molten metal in the charge vessel, while the latter flow path may facilitate removal of molten metal from the vessel and circulation of molten metal in the furnace. This might augment the vortex effect in that the pressure of the molten metal along the circulation passage 53 may assist in drawing molten metal down the outlet passageway 16. The pump may not be connected for fluid communication to the charge vessel at all. Alternatively, the pump may be removably connected for fluid communication to the charge vessel, which facilitates separate cleaning and replacement of pump parts.

Figure 9A:
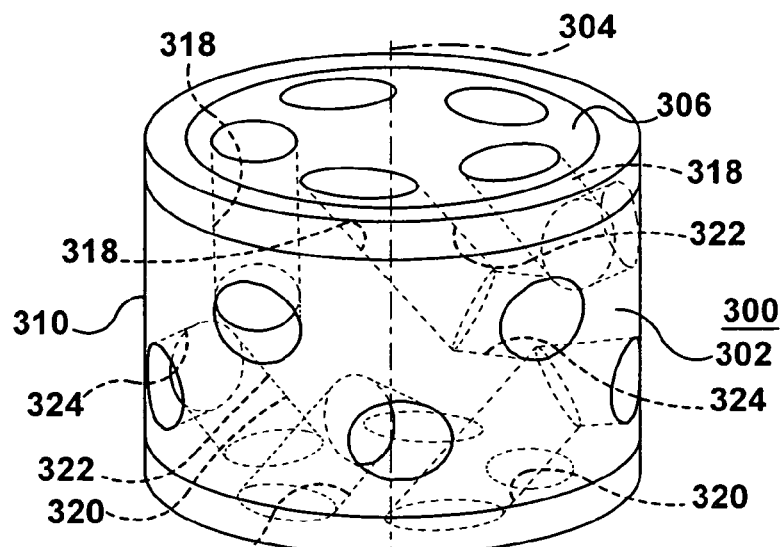
FIGS. 9A-9C are views of a barrel type baffle impeller constructed in accordance with the present invention and suitable for use in the inventive vortexer apparatus.
Figure 9B:
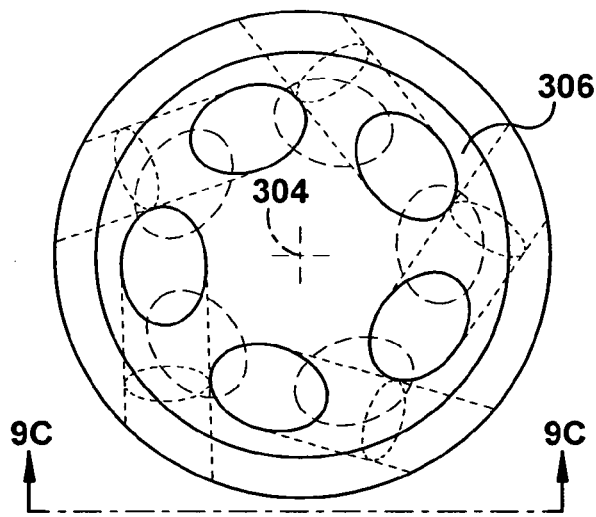
Figure 9C:
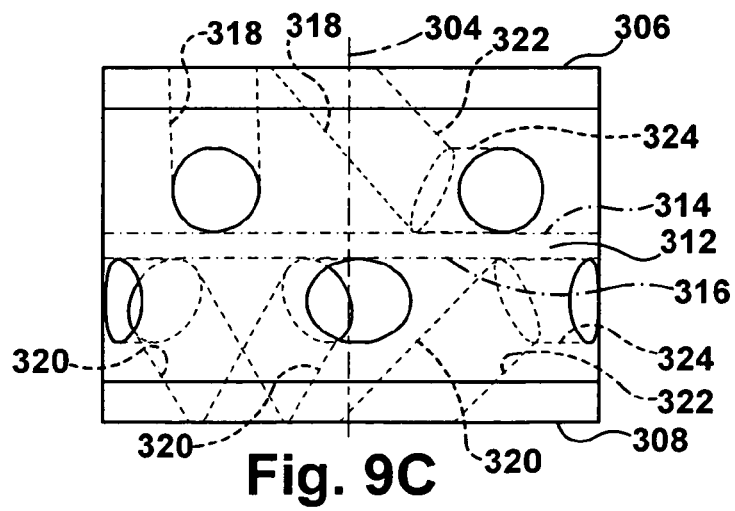

Another aspect of the inventive baffle impeller is the barrel type baffle impeller 300 shown in FIGS. 9A-9C. The barrel impeller is formed of refractory material and includes a generally cylindrical body 302 including a central rotational axis 304. An upper end face 306 is disposed at one end of the body and extends transverse to the axis 304. A lower end face 308 is disposed at an opposite end of the body and extends transverse to the axis 304. A side wall 310 extends between the upper and lower end faces along the axis 304. An imperforate baffle portion 312 of the body extends transverse to the axis and is located between the upper and lower end faces. In particular, the baffle portion 312 is located between parallel reference lines 314, 316 that extend transverse to the axis at a midpoint of the impeller. A plurality of upper passages 318 extend from the upper end face 306 to the side wall 310. A plurality of lower passages 320 extend from the lower end face 308 to the side wall 310. The upper and lower passages may include first and second passageway components 322, 324. In this exemplary design the passageway components 324 extend generally horizontally and the passageway components 322 extend upwardly or downwardly from an adjacent end face. It will be appreciated that the angles by which the passageway components 322, 324 extend may vary from what is shown in the drawings. The imperforate baffle portion 312 is located between the upper and lower passages at the side wall 310 and is effective to prevent fluid communication between them.

Figure 10:
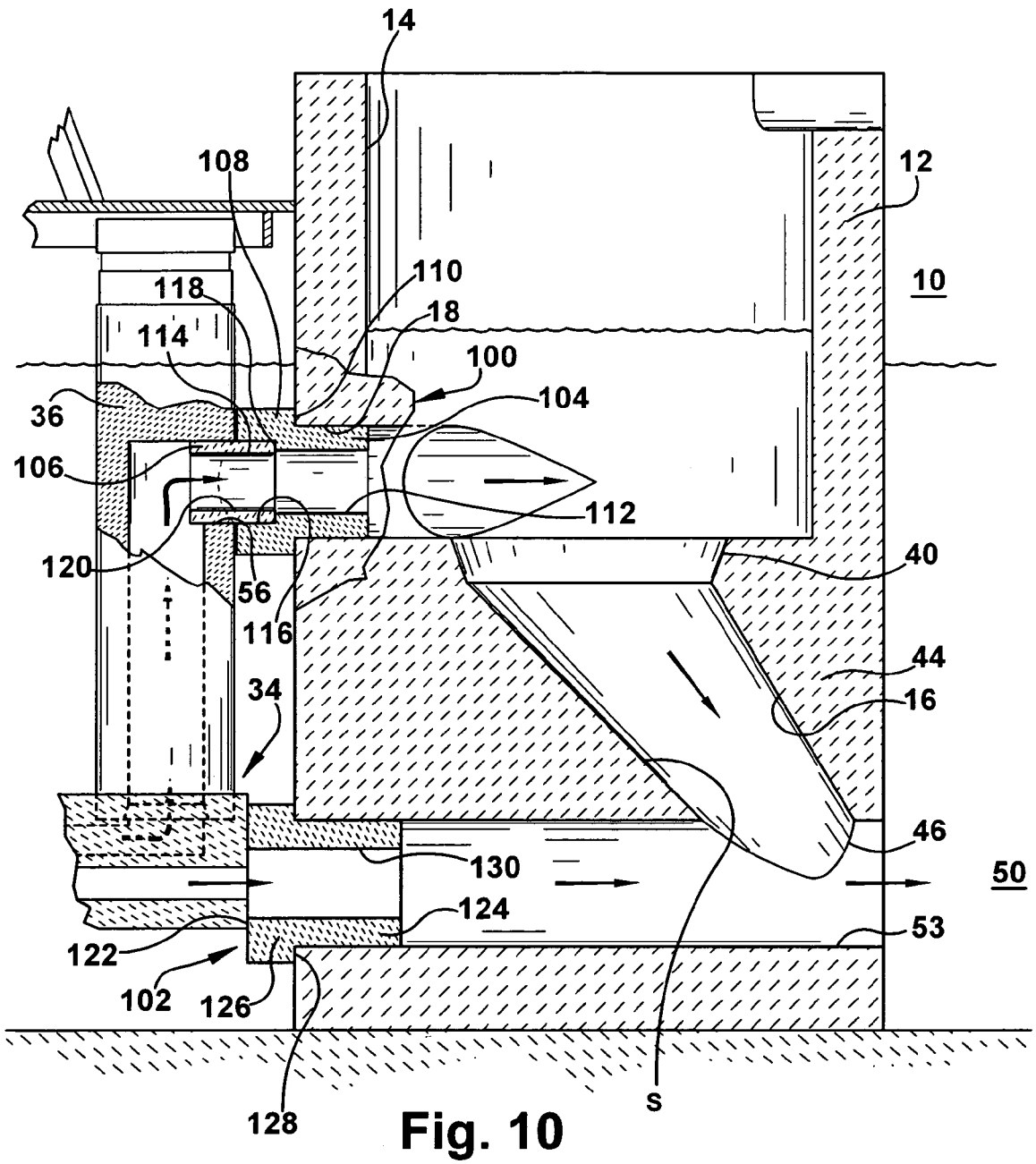
FIG. 10 is a vertical cross-sectional view of the vortexer vessel of FIG. 1.

Referring to FIG. 10, the inventive vortexer apparatus may include adapters 100, 102 for avoiding turbulence and inefficiencies resulting from molten metal traveling from the riser or discharge chamber that does not enter the vessel inlet opening or circulation passageway. Upper adapter 100 includes a male end 104 that is received in the vessel inlet passageway and an opposite male end 106 that is received in the riser. The adapter includes a body 108 and exterior shoulder 110 that contacts the vessel around the inlet opening. The male plug end 104 plugs into the vessel inlet passageway 18. A passageway 112 extends along the length of the body. The end 106 can include a conduit 114 received in the opening in the end of the riser and into an opening 116 in the adapter body around the central opening 112. The conduit is cemented to an interior seating surface 118 of the adapter body. The conduit has an interior passageway 120 of a diameter that approximates the diameter of the passageway 112. One end of the adapter can be cemented to either the riser or the vessel and the other end can be uncemented or unfastened, enabling efficient removal of the pump from the vessel. For example, the conduit 114 can be cemented into the adapter body and to the riser 36. The end 104 of the adapter body can be uncemented and thus, freely movable into and from the vessel inlet opening.

The lower adapter 102 includes one end 122 that contacts the base near the discharge passageway and an opposite male end 124 that is received in the circulation passageway 53. The lower adapter includes a body 126 having an exterior shoulder 128 that contacts the vessel around the circulation passageway. The male end 124 is plugged into the circulation passageway 53. A passageway 130 extends along the length of the adapter body. One end of the adapter can be cemented to either the base or the vessel and the other end can be uncemented or unfastened, enabling efficient pump installation or removal for repair or cleaning of the pump. For example, the end 124 can be cemented to the vessel in the circulation passageway 53 and the pump base can abut against the lower adapter without being cemented to it. The adapter can also include a male plug end that is configured to be received in the discharge passageway.

Figure 11:
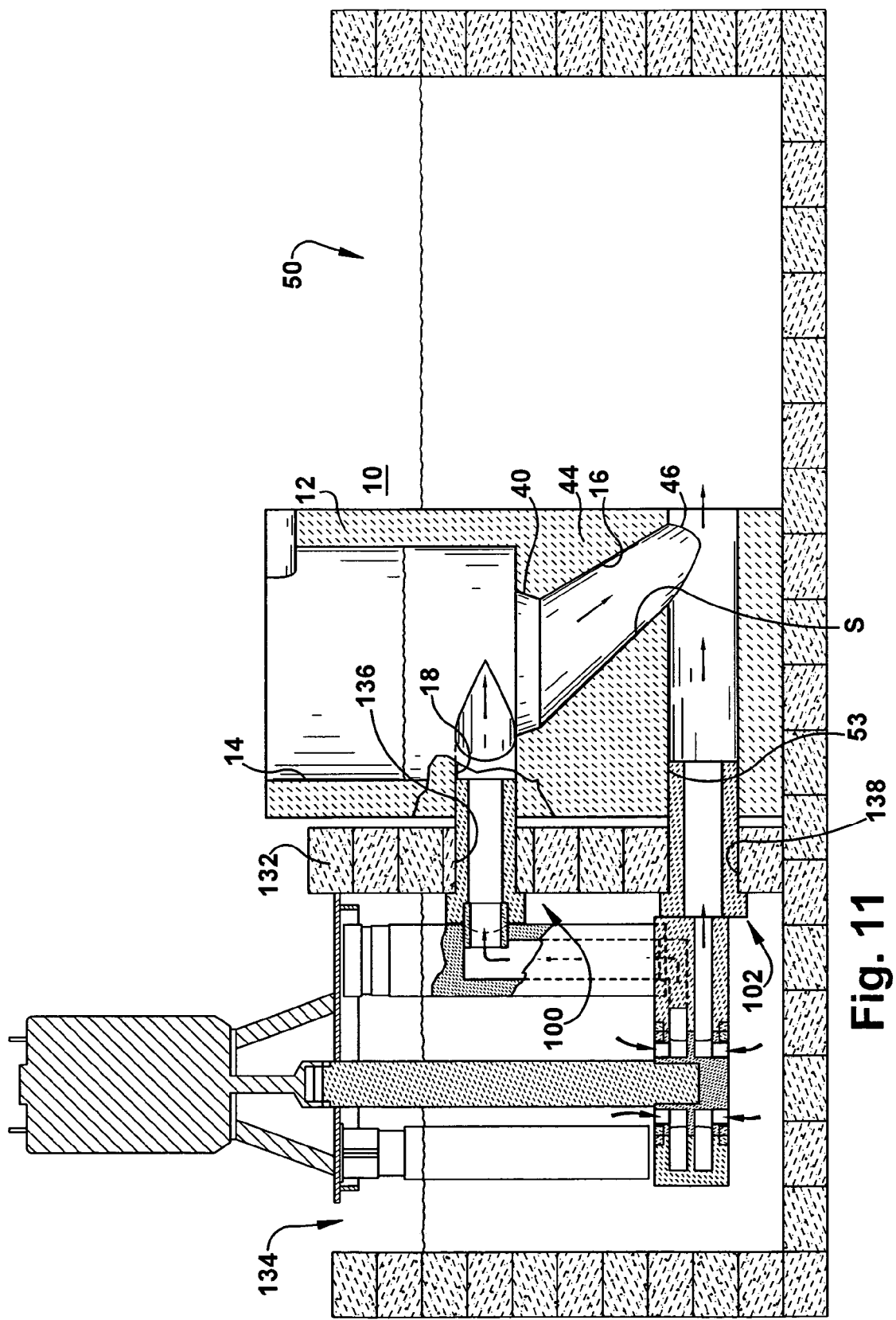
FIG. 11 is a vertical cross-sectional view of the inventive vortexer apparatus with a furnace wall between the pump and the vortexer vessel.

The inventive vortexer apparatus can be used in various furnace designs. Some furnaces may not have separate pumping and scrap charge chambers. Other furnaces may not have a dross removal chamber. As shown in FIG. 10 there does not need to be a furnace wall between the pump and charge well for the inventive vortexer apparatus to be used. Both the vessel and the pump can be disposed in a single chamber of molten metal. However, as shown in FIG. 11 there can be a furnace wall 132 between a scrap charge well or dross well 50 and another chamber 134 (e.g., a pumping chamber). The furnace wall of the well 50 is formed of a suitable refractory material such as refractory brick. An upper inlet passageway 136 and a lower circulation passageway 138 can be formed in the furnace wall. The male plug ends of the upper and lower adapters 100, 102 can be designed to have longer lengths and positioned to extend through the inlet and circulation passageways 136, 138 of the furnace wall. The vessel is positioned in the well 50 adjacent the furnace wall 132. The plug ends of the upper and lower adapters are inserted into the inlet passageway 18 and circulation passageway 53 of the vessel 12.

Figure 12:
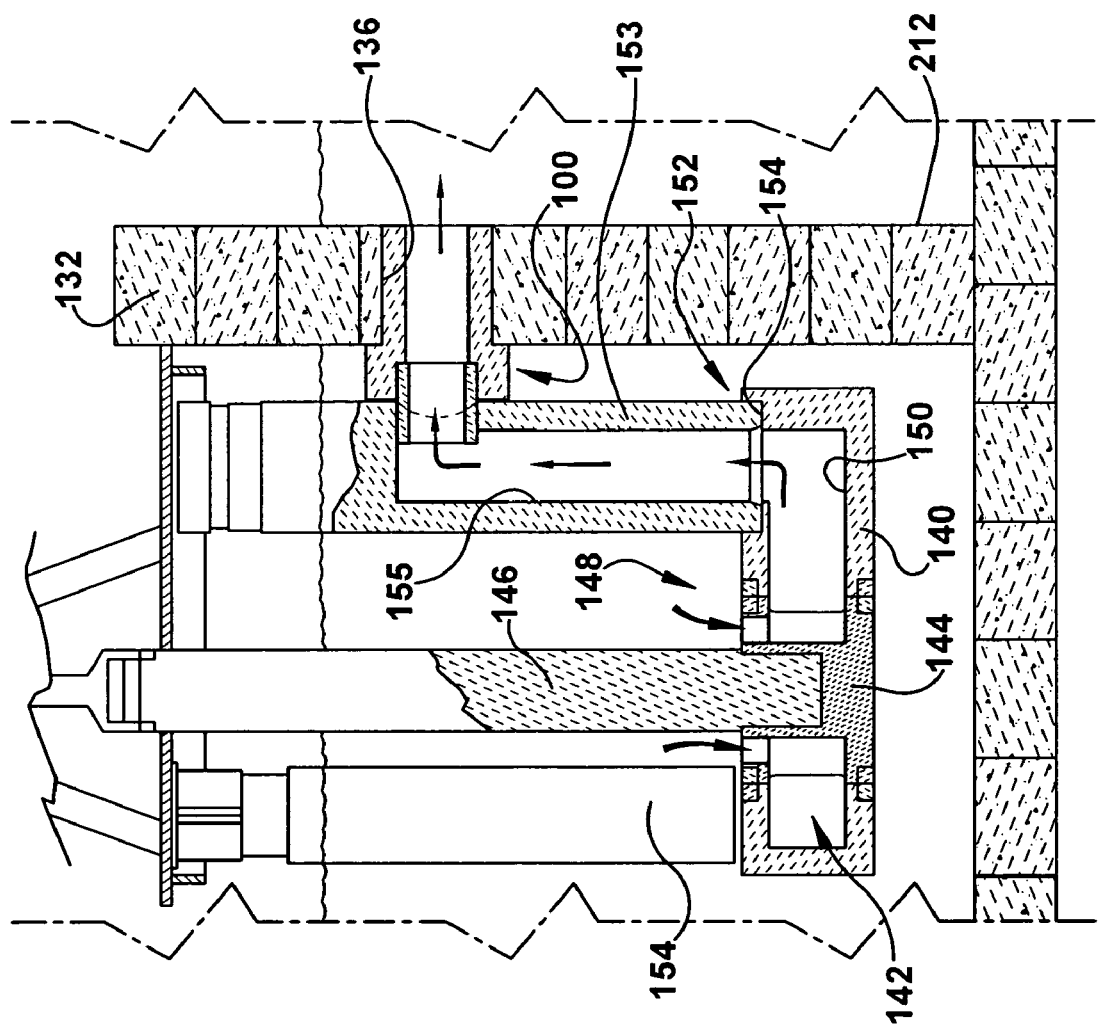
FIG. 12 is a view of a single impeller chamber pump suitable for use in the inventive vortexer apparatus.

In another aspect of the invention, pump base 140 may include only a single impeller chamber 142 as shown in FIG. 12. This impeller chamber includes a wall that forms a volute.

An impeller 144 is disposed on the end of a shaft 146 in the impeller chamber. The shaft is rotatably driven at an upper end portion by a motor outside the molten metal and the impeller is rotated on the shaft in the impeller chamber. The base includes at least one inlet opening 148 (e.g., an upper inlet opening in this design) and an outlet opening 150. A socket 152 is disposed around the outlet opening. A lower end of a riser 153 is cemented to a shoulder 154 of the socket and an upper end of the riser is fastened to the motor mount outside the molten metal. The riser includes a conduit 155 that forms a molten metal passageway extending from the outlet of the base to near a chamber inlet passageway 136. Support posts 154 and riser 153 are cemented at their lower ends to the base and removably clamped at their upper ends to the motor mount. This pump has no circulation capability. Molten metal is drawn through the upper base inlet 148 into the impeller chamber by the rotating impeller. The molten metal travels out of the base through the base outlet passageway 150, along the conduit 155 of the riser 153 through the vessel inlet opening 136 and into the vessel inlet passageway 18. This single impeller chamber pump provides only vortexer flow and not circulatory flow of molten metal. The single impeller chamber pump may include an adapter or not. There may or may not be a furnace wall 132 located between the pump and the vessel. If there is a furnace wall as shown in FIG. 12, the adapter 100 extends from the riser, through the wall 132 into engagement with the vessel 12 as described above. The particular adapter 100 shown in FIG. 12 ends flush with the interior of the charge well for use in an integrated charge well vortexer apparatus described below.

Figure 13:
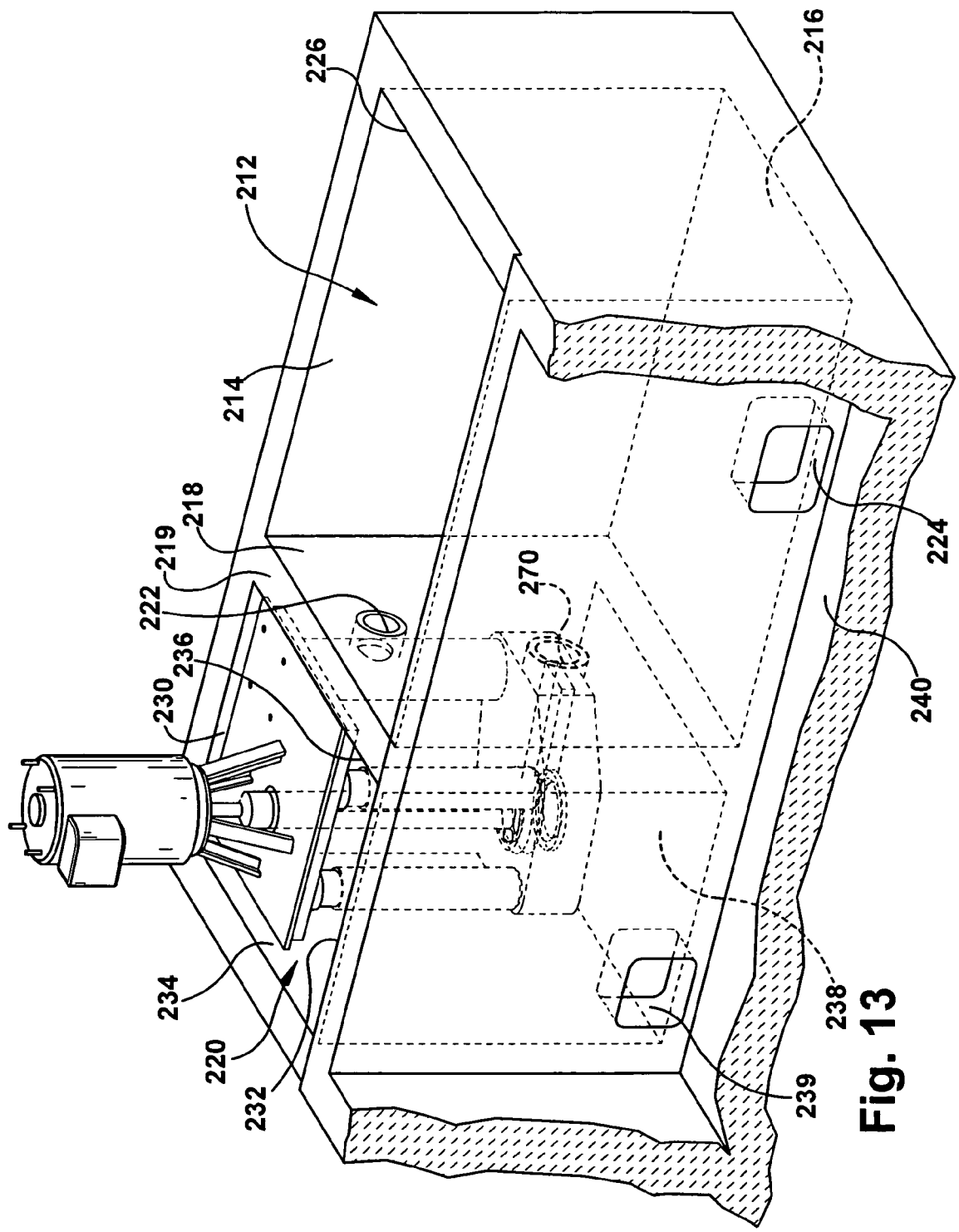
FIG. 13 is a view of a vortexer apparatus with integrated charge well.
Figure 14:
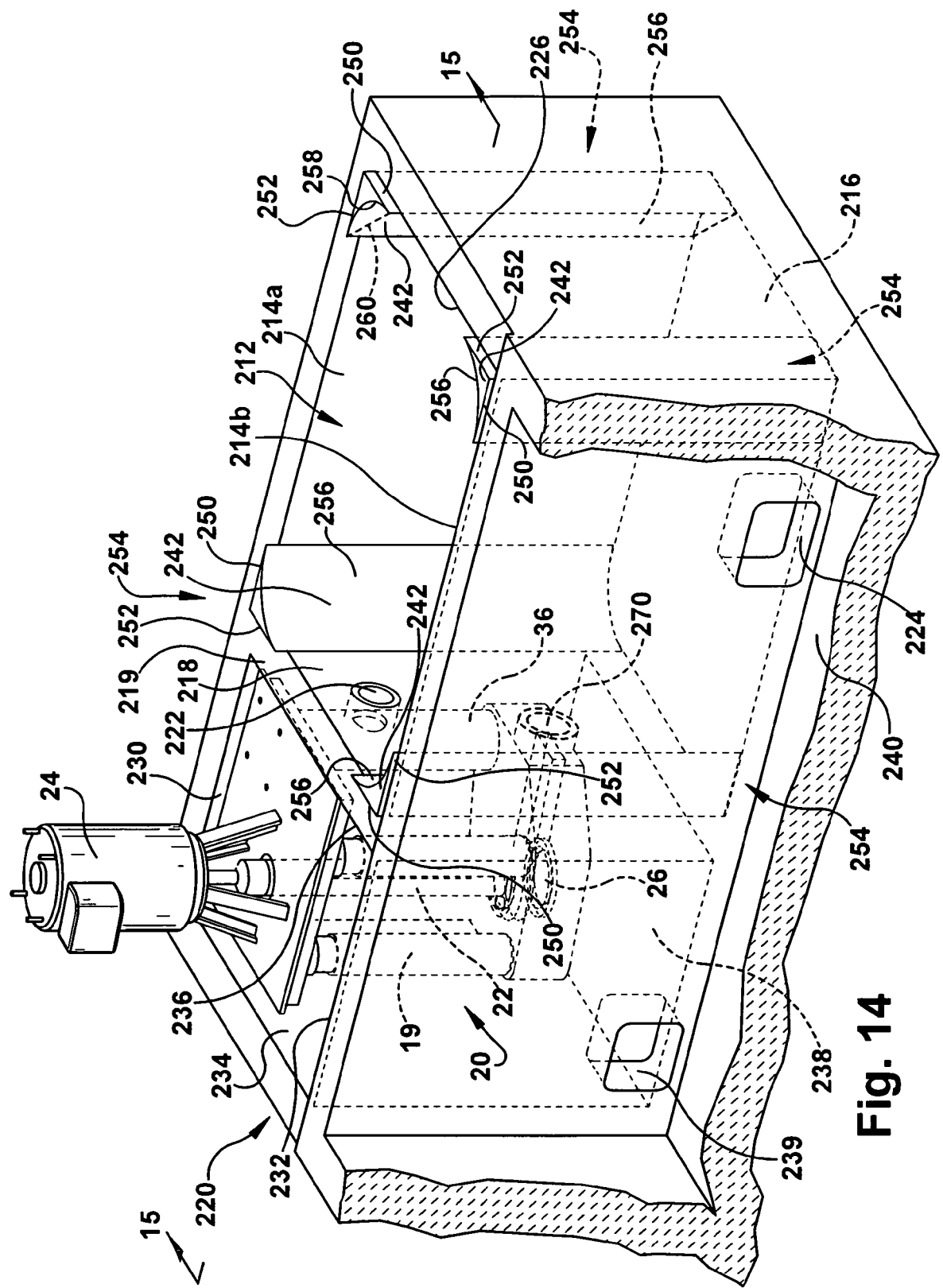
FIG. 14 is view of the vortexer apparatus of FIG. 13 including corner inserts that provide the charge well with an oval or generally circular shape.

Vortexer Apparatus with Integrated Charge Well:

Referring to another embodiment of the present invention shown in FIGS. 13 and 14, the vortexer apparatus includes an integrated charge well 212 having opposing side walls 214, a floor 216, a front surface 218 of separating wall 219 extending between the charge well and a pump well 220, a charge well inlet passageway 222 located in the separating wall, and an outlet passageway (e.g., an "archway") 224 located in side wall or in a back wall 226. Molten metal enters the charge well inlet passageway 222 at an offset location O relative to a center line CL of the charge well, and more particularly, at a location T generally tangential to the side wall of the charge well as seen in a top view of FIG. 16. In the case of the tangential inlet, the riser and possibly the pump can be located closer to an adjacent side wall 214a of the pump well and this may require a hole in the corner insert 242 discussed below. The charge well is formed by the interior wall surfaces 214a, 214b, 218, 226 and floor 216. In this exemplary design the walls are vertically extending as seen in a vertical cross-sectional view. The pump well 220 is formed by interior surfaces 230, 232, 234, interior surface 236 of separating wall 219 and floor 238. The pump well includes archway 239. Molten metal leaves the charge well through the outlet passageway 224 in the side wall 214b at a location near the bottom of the charge well and enters the hearth 240. Molten metal is pumped from the hearth through passageway 239 into the pump well and from the pump well through passage 222 or passages 222 and 270 into the charge well. The charge well, pump well, dross well and main hearth are formed of a suitable refractory material such as refractory furnace brick.

Figure 16:
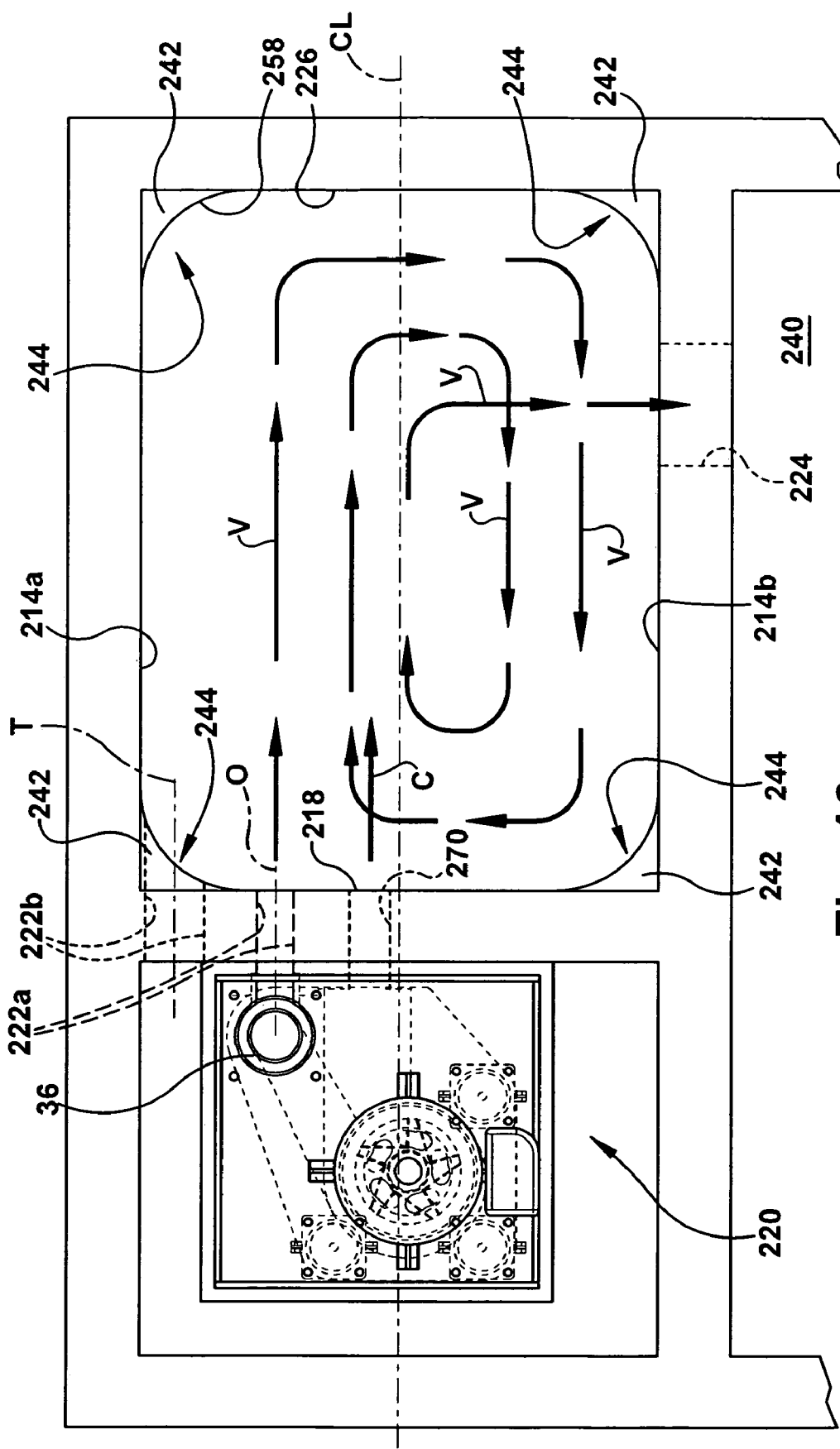
FIG. 16 is a top plan view of the vortexer apparatus of FIG. 14.

In one aspect of the invention, a charge well having a typical rectangular shape is used in forming the vortex as shown in FIG. 13 (i.e., side walls 214a and 214b being parallel to each other and front and back walls 218, 226 being parallel to each other and perpendicular to the side walls). In another aspect of the invention the charge well is modified or is originally constructed to have an oval, generally circular or other suitable shape in top view (FIG. 16). In retrofitting a furnace having a rectangular charge well, corner inserts 242 are inserted into the corners 244 of the charge well. Each corner of the charge well is formed in the rectangular chamber between a side wall and a perpendicular front or back wall. The corner inserts are shown in position in FIG. 14 and may be located flush, above or below the height of the charge well upper surface, but are disposed above the molten metal bath contained in the charge well. The corner inserts may be molded, cast or machined into a shape and size to fit the particular charge well in which they are adapted for use.

Each corner insert has orthogonal surfaces 250, 252 forming an exterior corner section 254 and an interior surface 256 which extends between the exterior surfaces 250, 252 (FIG. 14). The interior surface of the corner inserts is shaped so as to provide the charge well with an oval or circular shape. Interior surfaces 256, side walls 214a, 214b, front wall 218 and back wall 216 form an approximately oval shape (FIG. 16) To this end the corner inserts are generally triangular or other suitable shape. The interior surface can be an arcuate surface 258 or a flat surface 260 (as shown in dotted lines in FIG. 14). The exterior corner sections of the corner inserts are cemented into each corner of the charge well. The resulting oval or generally circular shape improves the performance of the integrated charge well as a vortex vessel.

Referring to FIGS. 13 and 14, a pump for pumping molten metal into the charge well is disposed in the molten metal of the pump well adjacent the charge well. This pump has all of the features of the pump shown in FIGS. 7A and 7b where like components share like reference numbers throughout the several views of this disclosure. It will also be apparent to one of ordinary skill in the art reading this disclosure that the pump of FIG. 12 could be substituted for the pump shown in FIGS. 13 and 14. This would result in the separating wall having only an upper inlet passageway not a lower circulation passageway.

Referring to FIGS. 13 and 14, molten metal is drawn into the base of the pump by rotation of the impeller in the volute, leaves the discharge passageway of the base and travels through the conduit 37 of the riser 36. Molten metal travels from the riser through the charge well inlet passageway 222 into the interior volume of the charge well defined by the charge well interior walls. Referring to FIG. 16, the off-set or tangential direction of flow of molten metal from the riser 36 and charge well inlet passageway 222 into the charge well creates a vortex in the molten metal of the charge well (shown approximately by arrows V). The molten metal enters the charge well from the charge well inlet passageway 222a offset relative to the center line of the charge well at location O or, more particularly, from the charge well inlet passageway 222b generally tangentially to the side wall at location T that is adjacent the side wall 214a. This flow of the molten metal from the charge well inlet passageway creates a vortex flow of molten metal in the charge well that will rapidly submerge and melt scrap introduced to the charge well. While not wanting to be bound by theory, it is also expected that molten metal will also form a vortex when introduced into the rectangular charge well shown in FIG. 13 that will draw down scrap metal charged into the mouth of the charge well.

Molten metal is also drawn into the lower inlet opening in the base, through the lower impeller inlet openings, travels through the lower impeller passages to the lower impeller cavities and leaves the impeller through the impeller outlets. Molten metal leaves the base through the discharge opening from the lower impeller chamber and travels into a charge well circulation passageway 270. Molten metal is circulated through the furnace by the circulatory molten metal stream (shown approximately by arrow C in FIG. 16) entering the charge well through the charge well circulation passageway, which may facilitate drawing down of the scrap in the vortex. Molten metal then travels through the outlet passageway 224 of the charge well to the next destination such as to a dross well or main hearth 240.

Figure 15:
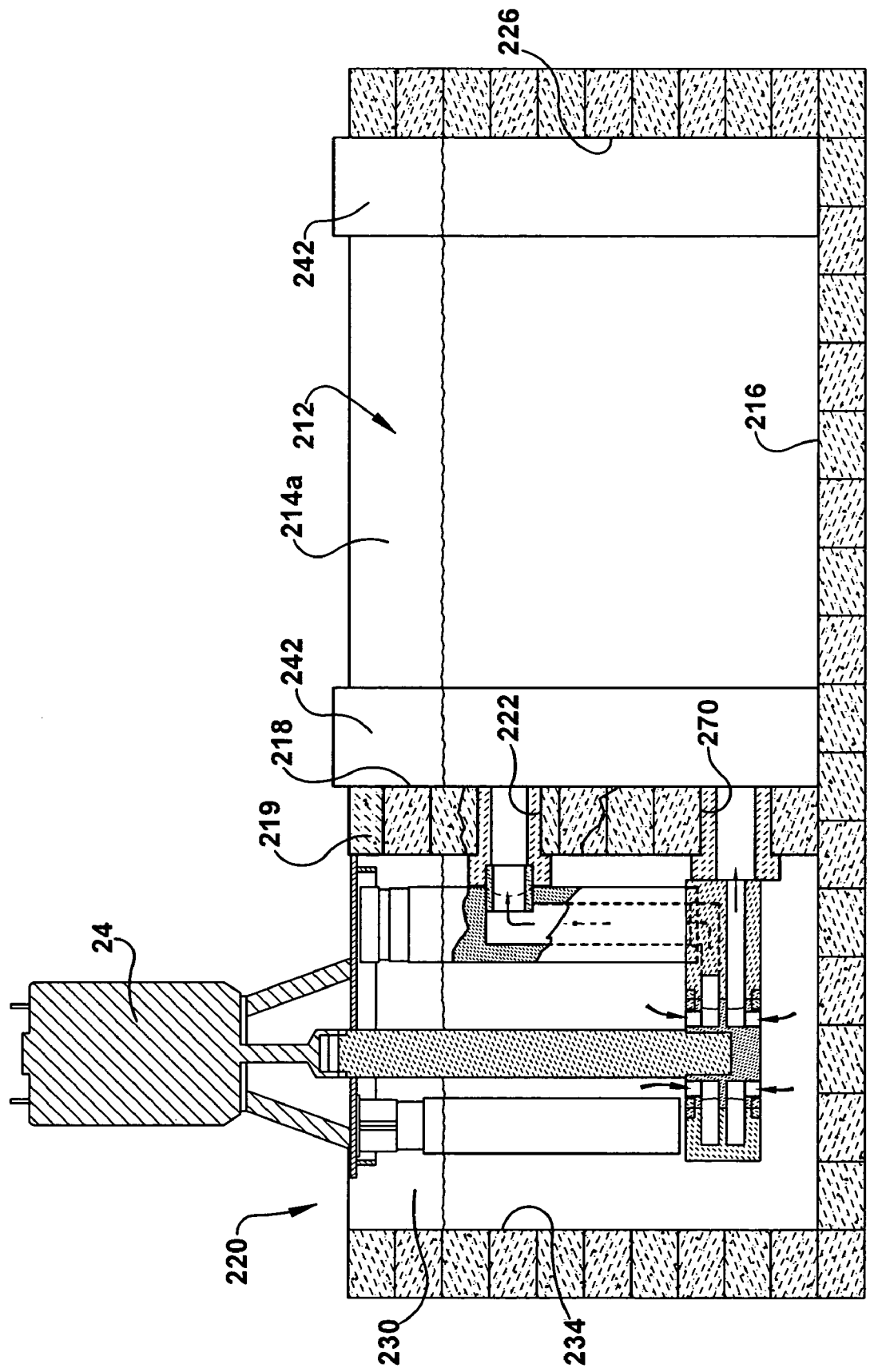
FIG. 15 is a side view of the vortexer apparatus of FIG. 14.

Upper and lower adapters 100, 102 may be mounted between the separating wall 219 and riser 36 and between the separating wall 219 and base discharge passageway 34b (FIG. 15) in the same manner as shown in FIG. 11 except that the adapters terminate at the interior surface of the charge well.

The vortexer apparatus with integrated charge well may include a pump with a single impeller chamber or two or more impeller chambers. For example, to achieve vortexer action and circulation, the separating wall 219 includes the upper charge well inlet passageway 222 and a lower charge well circulation passageway 270. The dual impeller chamber pump is used to direct molten metal from one impeller chamber along the riser, through any adapter and through the charge well inlet passageway and from the other impeller chamber along a discharge passageway, through any adapter and through the circulation passageway. This enables the charge well to exhibit the dual effects of vortexer action and molten metal circulation. A single impeller chamber pump (FIG. 12) directs molten metal along the riser through the charge well inlet passageway 222 into the charge well and has no circulatory capability.

It should be apparent to one of ordinary skill in the art reading this disclosure that the charge well inlet, vessel inlet, charge well circulation passageway and vessel circulation passageway can be location at different heights and different positions relative to the center line. In addition, rather than extending parallel to the center line, these passages can extend at angles relative to the center line along a horizontal plane and can extend at angles along a vertical plane. For example, the charge well inlet and the vessel inlet can extend at a downward angle and/or can be located closer to the center line and extend at an angle that directs molten metal closer to an adjacent side wall 14a or 214a.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A vortexer apparatus, comprising:
    a vessel comprising an exterior surface, an interior surface for containing molten metal and a mouth for receiving material at an upper end portion of said interior surface, an outlet passageway extending downwardly from said interior surface, and a vessel inlet opening located between said exterior surface and said interior surface above said outlet passageway, wherein a center line passes through a center of said interior surface and said vessel inlet opening is disposed at a location offset from said center line; and
    a pump adapted to pump molten metal into said vessel effective to form a vortex of molten metal in said vessel, comprising
        a motor,
        a shaft rotatably driven by said motor at an upper end,
        an impeller connected to a lower end of said shaft,
        a base adapted to be submerged in the molten metal, including an impeller chamber in which said impeller is rotatable, a base inlet into the impeller chamber, and a base outlet from the impeller chamber, said base and said impeller being configured and arranged effective to provide molten metal leaving said base outlet with a positive pressure, and
        an outlet conduit extending from said base outlet to near said vessel inlet opening, wherein said outlet conduit has a length extending from said base outlet to near said vessel inlet opening and said outlet conduit is constructed and arranged effective to be maintained at a temperature above which the molten metal solidifies, along said entire length of said outlet conduit,
    wherein said vessel is adapted to be at least partially submerged in molten metal contained in a chamber larger than said vessel, the outlet passageway of said vessel being adapted to direct the molten metal from said vessel into said chamber.

2. The vortexer apparatus of claim 1 wherein said offset location is in proximity to said interior surface of said vessel where said interior surface is perpendicular to said center line.

3. The vortexer apparatus of claim 1 wherein said interior surface is generally cylindrical.

4. The vortexer apparatus of claim 1 wherein said vessel includes a circulation passageway extending between the exterior surface at different locations of said vessel.

5. The vortexer apparatus of claim 4 wherein said base comprises a discharge passageway that extends from said impeller chamber to an exterior surface of said base at said base outlet and said base outlet is located near said circulation passageway of said vessel.

6. A vortexer apparatus comprising:
    a vessel comprising an exterior surface, an interior surface for containing molten metal and a mouth for receiving material at an upper end portion of said interior surface, an outlet passageway extending downwardly from said interior surface, and a vessel inlet opening located between said exterior surface and said interior surface above said outlet passageway, wherein a center line passes through a center of said interior surface and said vessel inlet opening is disposed at a location offset from said center line; and
    a pump adapted to pump molten metal into said vessel effective to form a vortex of molten metal in said vessel, comprising
        a motor,
        a shaft rotatably driven by said motor at an upper end,
        an impeller connected to a lower end of said shaft,
        a base adapted to be submerged in the molten metal, including an impeller chamber in which said impeller is rotatable, a base inlet into the impeller chamber, and a base outlet from the impeller chamber, said base and said impeller being configured and arranged effective to provide molten metal leaving said base outlet with a positive pressure, and
        an outlet conduit extending from said base outlet to near said vessel inlet opening, wherein said outlet conduit has a length extending from said base outlet to near said vessel inlet opening and said outlet conduit is constructed and arranged effective to be maintained at a temperature above which the molten metal solidifies, along said entire length of said outlet conduit,
    wherein said base includes two of said impeller chambers stacked over one another.

7. The vortexer apparatus of claim 6 wherein said impeller includes two impeller members each disposed in one of said impeller chambers, said base includes a web located between said impeller chambers having a web opening formed therein and said impeller comprises an imperforate baffle disposed between said impeller members in said web opening, said web and said baffle being adapted to inhibit molten metal flow between said impeller chambers.

8. The vortexer apparatus of claim 7 wherein said impeller includes an upper circular end face and a lower circular end face, upper vanes disposed between said baffle and said upper end face and lower vanes disposed between said baffle and said lower end face, said upper end face and said lower end face being perforated.

9. The vortexer apparatus of claim 1 comprising an adapter including a first end that contacts said vessel and a second end that contacts said outlet conduit effective to provide a conduit for molten metal to travel from said outlet conduit into said vessel inlet opening.

10. The vortexer apparatus of claim 5 comprising a first adapter including a first end that contacts said vessel and a second end that contacts said outlet conduit effective to provide a conduit for molten metal to travel from said outlet conduit into said vessel inlet opening, and a second adapter including a first end that contacts said vessel and a second end that contacts said base at said discharge passageway effective to provide a conduit for molten metal to travel from said discharge passageway into said circulation passageway of said vessel.

11. The vortexer apparatus of claim 1 wherein said impeller chamber includes a wall that forms a volute.

12. The vortexer apparatus of claim 1 wherein said mouth is configured to receive metal scrap as said material.

13. The vortexer apparatus of claim 1 wherein all components of said vortexer apparatus that contact said molten metal are formed of refractory material.

14. A vortexer apparatus, comprising:
a vessel comprising an exterior surface, an interior surface for containing fluid and a mouth for receiving material at an upper end portion of said interior surface, an outlet passageway extending downwardly from said interior surface, and a vessel inlet opening located between said exterior surface and said interior surface above said outlet passageway, wherein a center line passes through a center of said interior surface and said vessel inlet opening is disposed at a location offset from said center line, a circulation passageway extending between said exterior surface at different locations of said vessel; and
a pump adapted to pump fluid into said vessel effective to form a vortex of fluid in said vessel, comprising
a motor,
a shaft driven by said motor at an upper end,
an impeller connected to a lower end of said shaft, said impeller including an upper impeller member and a lower impeller member, and
a base adapted to be submerged in the fluid, including upper and lower impeller chambers stacked over one another, wherein said upper impeller member and said lower impeller member are rotatably disposed in said upper impeller chamber and said lower impeller chamber, respectively, a base inlet into at least one of said first and second impeller chambers, a base outlet from said first impeller chamber, an outlet conduit extending from said base outlet to near said inlet opening of said vessel, and a discharge passageway that extends from said second impeller chamber to an exterior surface of said base, said discharge passageway being disposed near said circulation passageway.

15. The vortexer apparatus of claim 14 comprising a first conduit extending from said outlet conduit to said vessel at said vessel inlet opening, and a second conduit extending from said discharge passageway to said vessel at said circulation passageway of said vessel.

* * * * *